US012680199B2

(12) United States Patent
Wetzel et al.

(10) Patent No.: US 12,680,199 B2
(45) Date of Patent: Jul. 14, 2026

(54) MULTI-MATERIAL POLYMER FILAMENT FOR THREE-DIMENSIONAL PRINTING

(71) Applicant: U.S. Army Research Laboratory, Adelphi, MD (US)

(72) Inventors: Eric D. Wetzel, Baltimore, MD (US); Kevin R. Hart, Milwaukee, WI (US); Ryan M. Dunn, Belcamp, MD (US)

(73) Assignee: The United States of America represented by the Secretary of the Army, Washington, DC (US)

( * ) Notice: Subject to any disclaimer, the term of this patent is extended or adjusted under 35 U.S.C. 154(b) by 0 days.

(21) Appl. No.: 16/814,353

(22) Filed: Mar. 10, 2020

(65) Prior Publication Data

US 2022/0033998 A1 Feb. 3, 2022

Related U.S. Application Data

(63) Continuation of application No. 15/630,175, filed on Jun. 22, 2017, now Pat. No. 10,968,539, and a (Continued)

(51) Int. Cl.
  *D01F 8/14* (2006.01)
  *B29C 35/02* (2006.01)
  (Continued)

(52) U.S. Cl.
  CPC ............... *D01F 8/14* (2013.01); *B29C 35/02* (2013.01); *B29C 55/00* (2013.01); *B29C 64/106* (2017.08);
  (Continued)

(58) Field of Classification Search
  CPC ... D01F 8/00; D01D 5/24; D01D 5/30; D01D 5/253; Y10T 428/2929; Y10T 428/2973
  See application file for complete search history.

(56) References Cited

U.S. PATENT DOCUMENTS

| 5,593,778 A | * | 1/1997 | Kondo | ...................... | D01F 8/14 |
| | | | | | 428/373 |
| 6,051,175 A | * | 4/2000 | Kurihara | .................. | D04H 3/02 |
| | | | | | 264/210.8 |

(Continued)

FOREIGN PATENT DOCUMENTS

WO WO-2013133056 A1 * 9/2013 ............... D01D 4/06

OTHER PUBLICATIONS

Machine Translation of WO2013133056 (Year: 2013).*

(Continued)

*Primary Examiner* — Jenna N Chandhok
(74) *Attorney, Agent, or Firm* — Eric B. Compton

(57) ABSTRACT

A thermoplastic filament comprising multiple polymers of differing flow temperatures in a geometric arrangement is described. A method for producing such a filament is also described. Because of the difference in flow temperatures, there exists a temperature range at which one polymer is mechanically stable while the other is flowable. This property is extremely useful for creating thermoplastic monofilament feedstock for three-dimensionally printed parts, wherein the mechanically stable polymer enables geometric stability while the flowable polymer can fill gaps and provide strong bonding and homogenization between deposited material lines and layers. These multimaterial filaments can be produced via thermal drawing from a thermoplastic preform, which itself can be three-dimensionally printed. Furthermore, the preform can be printed with precisely controlled and complex geometries, enabling the creation of a filament or fiber with a wide range of applications. A method is also described for including an interior thread that adds structural reinforcement or functional properties, such as electrical conductivity or optical waveguiding, to the filament.

50 Claims, 25 Drawing Sheets

Related U.S. Application Data continuation-in-part of application No. 15/081,048, filed on Mar. 25, 2016, now Pat. No. 11,001,945.

(60) Provisional application No. 62/817,161, filed on Mar. 12, 2019, provisional application No. 62/139,313, filed on Mar. 27, 2015.

(51) Int. Cl.

| | |
|---|---|
| *B29C 55/00* | (2006.01) |
| *B29C 64/106* | (2017.01) |
| *B29C 64/118* | (2017.01) |
| *B29C 65/00* | (2006.01) |
| *B29C 65/56* | (2006.01) |
| *B29D 11/00* | (2006.01) |
| *B29K 33/00* | (2006.01) |
| *B29K 55/02* | (2006.01) |
| *B29K 69/00* | (2006.01) |
| *B29K 105/08* | (2006.01) |
| *B29L 31/00* | (2006.01) |
| *B33Y 70/00* | (2020.01) |
| *D01D 5/24* | (2006.01) |
| *D01D 5/30* | (2006.01) |
| *D01F 8/00* | (2006.01) |
| *D01F 8/10* | (2006.01) |
| *D01F 8/18* | (2006.01) |
| *G02B 6/02* | (2006.01) |
| *B29L 11/00* | (2006.01) |

(52) U.S. Cl.
CPC .......... *B29C 64/118* (2017.08); *B29C 65/565* (2013.01); *B29C 66/5241* (2013.01); *B29C 66/53* (2013.01); *B29C 66/61* (2013.01); *B29D 11/00663* (2013.01); *B29D 11/00701* (2013.01); *B29D 11/00721* (2013.01); *B33Y 70/00* (2014.12); *D01D 5/24* (2013.01); *D01D 5/30* (2013.01); *D01F 8/00* (2013.01); *D01F 8/10* (2013.01); *D01F 8/18* (2013.01); *B29K 2033/12* (2013.01); *B29K 2055/02* (2013.01); *B29K 2069/00* (2013.01); *B29K 2105/08* (2013.01); *B29L 2011/0075* (2013.01); *B29L 2031/731* (2013.01); *D10B 2321/08* (2013.01); *D10B 2321/10* (2013.01); *D10B 2331/04* (2013.01); *D10B 2401/20* (2013.01); *G02B 6/02033* (2013.01); *Y10T 428/2929* (2015.01); *Y10T 428/2973* (2015.01)

(56) References Cited

U.S. PATENT DOCUMENTS

| | | | | |
|---|---|---|---|---|
| 2009/0253323 A1* | 10/2009 | Mueller | .................... | B32B 7/12 |
| | | | | 524/425 |
| 2012/0070619 A1* | 3/2012 | Mikulak | ................ | B33Y 10/00 |
| | | | | 428/156 |
| 2014/0374106 A1* | 12/2014 | Zhu | .......................... | D01D 5/30 |
| | | | | 166/305.1 |
| 2015/0329991 A1* | 11/2015 | Masuda | ................... | D01D 5/36 |
| | | | | 428/374 |
| 2016/0136887 A1* | 5/2016 | Guillemette | ........... | B33Y 70/00 |
| | | | | 425/297 |

OTHER PUBLICATIONS

Masamoto Watanabe, "Suede-type Man-Made Leather for Clothing," Konan Women's College researches (19), 133-142, Mar. 20, 1983.

N.A. Shitov et al., "Preparation of Ultra-thin Fibers from Polymer Mixture," Fibre Chem, v. 17. n.5. 305-311, 1986.

Min Chen, et al., "Analyses of Structures for a Synthetic Leather Made of Polyurethane and Microfiber," Journal of Applied Polymer Science, vol. 103, 903-908 (2007).

Hubei Decon, "What is sea-island fiber?" Blog post on https://www.polyestermfg.com/what-is-sea-island-fiber-is-there-a-sea-island-in-the-fiber/ (Mar. 19, 2017).

Na Xu, et al., "Construction of a Novel Substrate of Unfigured Islands-in-Sea Microfiber Synthetic Leather Based on Waste Collagen," ACS Omega 2021, 6, 26086-26097.

Bing Song, et al., "Properties and Structure of Thermoplastic Polyvinyl Alcohol/Polyamide Sea-Island Fibers," Polymers 2023, 15, 2071.

Hiroshi Fu, et al., "Current advances on sea-island microfiber nonwoven materials preparation technology and its applications: a review," The Journal of The Textile Institute, 115:10, 2031-2041, 2024.

CNC Kitchen: PC-Core ABS—"WARP-FREE annealing with Ingenious Dual-Material Filament" video posted on YouTube, https://www.youtube.com/watch?v=z3aUGmfnmlg (posted Jul. 18, 2020). Transcript included.

* cited by examiner 1 cm

HFT

LFT 1 cm printed, opaque
PC core hollow sections; air extruded, transparent
PC sheathing 5 mm 100 3D printer
101 preform
102 preform feed mechanism
103 pre-heat zone
104 main oven
105 chiller
106 diameter measurement
107 tension meter
108 take-up spool
109 filament
110 thread spool
111 thread 120 integrated 3D print head 101 preform 102 preform feed mechanism 103 pre-heat zone 104 main oven 105 chiller 106 diameter measurement 107 tension meter 108 take-up spool 109 filament 120  integrated 3D print head 101  preform 102  preform feed mechanism 103  pre-heat zone 104  main oven 105  chiller 106  diameter measurement 107  tension meter 108  take-up spool 109  filament 110  thread spool 111  thread Number of arms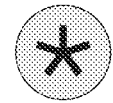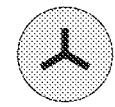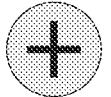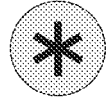
FIG. 10A  FIG. 10B  FIG. 10C  FIG. 10D
Shape of arms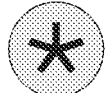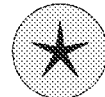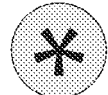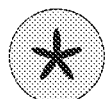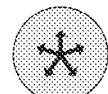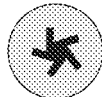
FIG. 10A  FIG. 10E  FIG. 10F  FIG. 10G  FIG. 10H  FIG. 10I
Length of arms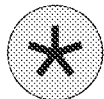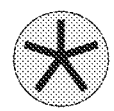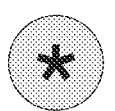
FIG. 10A  FIG. 10J  FIG. 10K
Thickness of arms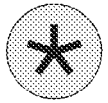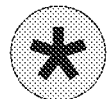
FIG. 10A   FIG. 10M
Surface coverage of P1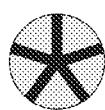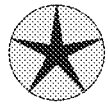
50%        65%        80%        100%
FIG. 11A  FIG. 11B  FIG. 11C  FIG.11D
Outer ring thickness of P1, relative to overall radius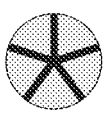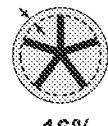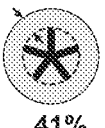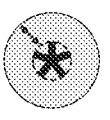
0%         16%        41%         59%
FIG. 11E    FIG. 11F  FIG. 11G    FIG. 11H
Percentage of material core comprising P2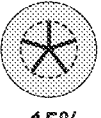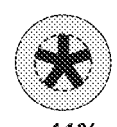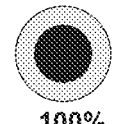
15%        29%        41%        100%
FIG. 11I   FIG. 11J   FIG. 11K   FIG. 11L

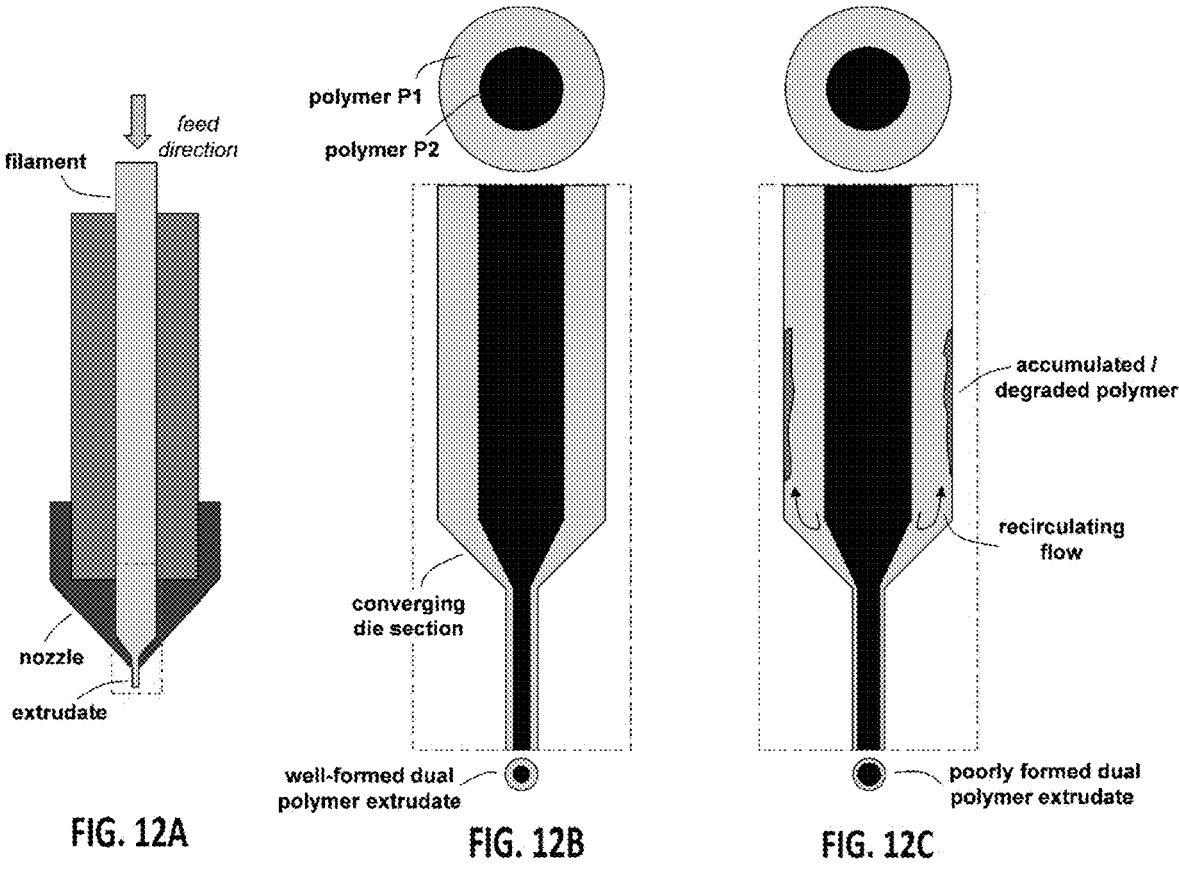
FIG. 12A
FIG. 12B
FIG. 12C
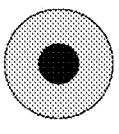  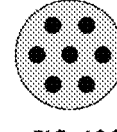  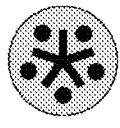
FIG. 13A     FIG. 13B     FIG. 13C     FIG. 13D

X1
*5-spoke w/ flange*

X2
*3 spoke w/ flange*

X3
*8-spoke no flange*

X4
*5-spoke no flange*

X5
*Cartesian*

X6
*Concentric*

X7
*Concentric vf*

X8
*Asterisk*

P   AB 25 mm→   ←

Heat 1.75 mm→ ←

ABS, as printed

X8, as printed

ABS, after anneal

X8, after anneal 5 mm

Specimen orientation during annealing

FIG. 22

| Label | Filament type | Surface area coverage of P1 | Volume fraction of P1 | Band thickness of P1 divided by filament radius |
|---|---|---|---|---|
| PC | PC | 0% | 0% | 0% |
| PC-ABS | PC/ABS Blend | 0% | 0% | 0% |
| X1 | 5 Spoke w/flange | 52% | 58% | 0% |
| X2 | 3 Spoke w/flange | 73% | 74% | 0% |
| X3 | 8 Spoke, no flange | 76% | 55% | 0% |
| X4 | 5 Spoke, no flange | 84% | 69% | 0% |
| X5 | Cartesian | 100% | 81% | 0% |
| X6 | Concentric | 100% | 60% | 41% |
| X7 | Concentric vf | 100% | 82% | 58% |
| X8 | Asterisk | 100% | 82% | 36% |
| ABS | ABS | 100% | 100% | 100% |
| IM-ABS | Injection-molded ABS | 100% | 100% | 100% |

FIG. 23

| Label | Filament type | Number of samples | Avg. $J_{Ic}$ ($J/m^2$) | Std. dev. $J_{Ic}$ ($J/m^2$) | Number of ductile failures | Number of brittle failures |
|---|---|---|---|---|---|---|
| PC | PC | 4 | 121 | 117 | 0 | 4 |
| PC-ABS | PC/ABS Blend | 4 | 320 | 100 | 0 | 4 |
| X1 | 5 Spoke w/flange | 3 | 282 | 176 | 0 | 3 |
| X8 | Asterisk | 4 | 566 | 324 | 1 | 3 |
| ABS | ABS | 9 | 256 | 84 | 0 | 9 |

FIG. 24

| Label | Filament type | Number of samples | Avg. $J_{1c}$ ($J/m^2$) | Std. dev. $J_{1c}$ ($J/m^2$) | Number of ductile failures | Number of brittle failures |
|---|---|---|---|---|---|---|
| PC | PC | 2 | 296 | 266 | 0 | 2 |
| PC-ABS | PC/ABS Blend | 3 | 834 | 175 | 0 | 3 |
| X1 | 5 Spoke w/flange | 3 | 1333 | 324 | 0 | 3 |
| X2 | 5 Spoke w/flange | 5 | 786 | 763 | 2 | 3 |
| X3 | 8 Spoke, no flange | 3 | 730 | 130 | 0 | 3 |
| X4 | 5 Spoke, no flange | 4 | 1112 | 817 | 4 | 0 |
| X5 | Cartesian | 4 | 1210 | 900 | 2 | 2 |
| X6 | Concentric | 5 | 2600 | 1310 | 3 | 2 |
| X7 | Concentric vf | 3 | 3063 | 1607 | 3 | 0 |
| X8 | Asterisk | 4 | 3970 | 870 | 4 | 0 |
| ABS | ABS | 2 | 6935 | 160 | 2 | 0 |
| IM-ABS | Injection-molded ABS | - | 5690 | 340 | All | - |

FIG. 25

| Label | Filament type | Creep rate ($\mu m/min$) |
|---|---|---|
| PC | PC | 1.48 |
| PC-ABS | PC/ABS Blend | 1.91 |
| X1 | 5 Spoke w/flange | 1.50 |
| X6 | Concentric | 2.04 |
| X8 | Asterisk | 2.15 |
| ABS | ABS | 17.95 |

MULTI-MATERIAL POLYMER FILAMENT FOR THREE-DIMENSIONAL PRINTING

CROSS-REFERENCE TO RELATED APPLICATIONS

This non-provisional patent application claims the benefit of is U.S. Provisional Application No. 62/817,161 titled "Multi-Material Thermoplastic Filament with Regular Geometry for Extrusion Additive Manufacturing" filed on Mar. 12, 2019 and is a continuation-in-part application of and claims priority to and the benefit of U.S. Non-Provisional application Ser. No. 15/630,175, filed on Jun. 22, 2017, which claims the benefit of U.S. Provisional Application No. 62/353,207, titled "Geometrically Regular, Multi-Material Polymer Filament for Three-Dimensional Printing Co-Drawn with Inextensible Fibers" filed on Jun. 22, 2016, which are both hereby incorporated by reference herein including all attachments and papers filed with U.S. Provisional Application No. 62/353,207 and U.S. Non-Provisional application Ser. No. 15/630,175. This non-provisional patent application is also a continuation-in-part of U.S. Non-Provisional application Ser. No. 15/081,048, titled "Geometrically Regular, Multi-Material Polymer Filament for Three-Dimensional Printing" filed on Mar. 25, 2016 that claims priority to and the benefit of U.S. Provisional Application No. 62/139,313, titled "Geometrically Regular, Multi-Material Polymer Filament for Three-Dimensional Printing" filed on Mar. 27, 2015. All of which are hereby incorporated by reference herein including all attachments and papers filed with U.S. Provisional Application Nos. 62/139,313 and 62/353,207 and U.S. Non-Provisional application Ser. Nos. 15/081,048 and 15/630,175. All of the above-identified provisional and non-provisional patent applications and all documents attached or filed with the above-identified provisional and non-provisional patent applications are hereby incorporated by reference herein.

GOVERNMENT INTEREST

The invention described herein may be manufactured, used, and licensed by or for the United States Government.

FIELD

The present invention relates generally to the field of materials. More specifically, materials and devices are provided for use in production of complex fibers for many applications such as three-dimensional printing methods and systems, optical fibers, electronic fibers, or microfluidic fibers, among other applications. In particular aspects, materials and material structures are provided that provide superior capabilities in formation of complex fibers.

BACKGROUND

Three-dimensional printing technology, also referred to as additive manufacturing technology, creates physical models from computational models, usually layer upon layer, unlike traditional subtractive manufacturing technologies. Additive manufacturing processes that create physical models by melt-depositing thermoplastic filaments can be referred to as fused filament fabrication (FFF), although other terms such as fused deposition modeling, extrusion printing, and plastic jet printing are also used. Additive manufacturing processes are known in the art, for example as illustrated and described in U.S. Pat. No. 5,121,329.

It is desirable for FFF parts to accurately reproduce the precise geometry of the source computational model, while providing high strength and stiffness and, in some cases, other functionalities such as electrical conductivity or optical clarity. Thermoplastics exhibit viscoelastic thermal softening, in which elastic stiffness and viscosity reduce gradually as temperature is increased. It is desirable to execute FFF at lower temperatures, in which the thermoplastic is less flowable and more mechanically stable, in order to accurately create geometries while minimizing errors due to part sag, shrinkage, or warpage. However, it is also desirable to execute FFF at higher temperature, in which the thermoplastic has high flow and forms strong thermoplastic welds between print lines and layers, to increase the mechanical stiffness and strength of the part while reducing porosity and surface roughness. Since both high flow and high mechanical stability conditions cannot be met simultaneously with a single polymer, FFF is typically executed at a compromised temperature at which weldlines partially fuse, providing a moderate level of mechanical robustness, and at which there is a moderate but acceptable level of geometric sag, shrinkage, and/or warpage.

For these reasons, the strength between layers (also called "z-direction" strength or "interlaminar" strength) in an FFF part is a critical weakness of the part. Interlaminar strength values tend to be less than half of the tensile strength measured within a material layer (also called "x-direction" or "y-direction" strength, or "in-plane" strength). In addition, interlaminar failures tend to be brittle, resulting in sudden and catastrophic failure. This behavior is in contrast to typical injection molded thermoplastics, which do not have weak interlaminar interfaces, and instead fail in a ductile manner with high toughness. For these reasons, FFF parts are commonly used for models or prototypes, but are not as desirable for engineering applications. That is, under mechanical loading, FFF parts typically fail at lower loads, and with less warning, compared to injection molded parts.

Some attempts have been made to create FFF feedstock by blending two thermoplastics with different melt temperatures, such as by feeding both polymers into an extruder. The resulting thermoplastic monofilament contains two polymers of differing flow temperatures, but the polymers are mixed randomly into a non-regular cross-sectional arrangement. This blended material typically exhibits flow and sag characteristics equivalent to an average of the properties of the individual polymer phases, and does not provide any distinct advantages over conventional FFF monofilament feedstock. For blended filaments with a majority of low flow-temperature polymer, heating the filament leads to bulk softening of the filament, since the random and likely disconnected arrangement of the higher flow-temperature polymer does not provide a means of efficiently supporting mechanical load. Similarly, blended filaments with a majority of high flow-temperature polymer are unlikely to exhibit good flow and bonding at lower temperatures, as much of the low flow-temperature polymer is likely to be trapped within the higher flow-temperature polymer.

In addition to compromises in mechanical and geometric characteristics, insufficient weldline fusing also compromises functional properties of conventional FFF parts. For example, FFF from optically clear feedstock leads to white or translucent parts due to scattering from trapped air-filled voids. Heating the part can be used to flow the polymer, eliminating the voids and creating a transparent part, but geometric accuracy will be lost. Similarly, electrically conductive thermoplastic feedstock is available that is composed of conductive filler, such as carbon black or metal filings, dispersed in a conventional thermoplastic. As-printed weldlines are unlikely to have electrical conductivity as high as the original feedstock, because the conductive filler cannot fully disperse and make contact across the weld line. Heating the part can reduce or eliminate the weldlines, potentially increasing filler-to-filler contact and therefore electrical conductivity, but geometric accuracy will be lost. Typical FFF parts are not watertight or gas tight due to the presence of a percolated void network, which could be reduced or de-percolated by healing weldlines. Finally, the surface finish on FFF parts tends to have a rough, stair-step appearance due to the layer-by-layer nature of the deposition process. Processing that enables a smoothing of these surface features would result in improved part aesthetics, as well as improved function for applications including optical components, sliding or wear surfaces, and worn devices requiring surfaces that are pleasant for human touch.

As such, a new approach is needed to enable the fabrication of FFF parts with high functional properties and high geometric stability, including approaches in which post-anneals (subjecting the part to temperatures greater than room temperature for a finite period of time) may be used to increase functional properties without compromising geometric accuracy.

Additionally, there is a need to create monofilaments and fibers with complex and tailorable cross-sectional arrangements. For example, optically waveguiding or diffracting fibers can be created with precise arrangements of materials with varying indices of refraction, and materials with scattering, reflective, or absorbing properties. Microfluidic fibers, such as would be used for example in vascularly accessed medical procedures, are needed in which multiple flow cavities are contained within a single fiber. Creating fibers with images, text, symbols, logos, or a barcode microscopically incorporated into the fiber cross-section could be useful for anti-counterfeiting, tagging, identification, tracking, or beautification of specialized goods and materials.

Many of these complex cross-section fibers could conceivably be fabricated by forcing molten polymer through a complex metal die via a conventional extrusion process. However, such extrusion dies are complex and expensive to design and fabricate, and require long lead times and specialized skill to create and implement. Combining multiple materials, in particular, via co-extrusion requires multiple extruders and very complex die arrangements that can dramatically increase manufacturing costs. An example of a complex die for extruding bicomponent fibers illustrated and described in U.S. Pat. No. 7,150,616. It is rarely economical to co-extrude more than three different polymers, placing a further limitation on this approach. An approach that would allow fabrication of complex cross-section, multi-material fibers in a matter of hours, with relatively modest skills and facilities, and a very diverse range of highly tailorable geometry and material combinations, would be of great industrial and technological importance.

As such, there is a need for new materials suitable for use in additive manufacturing processes that allow for improved weldline performance and reduction in the need for post-manufacturing processes thereby improving geometric accuracy, as well as providing complex, cross section fibers that are capable of maintaining geometrical arrangements.

SUMMARY

The following summary of the invention is provided to facilitate an understanding of some of the innovative features unique to the present invention and is not intended to be a full description. A full appreciation of the various aspects of the invention can be gained by taking the entire specification, claims, drawings, and abstract as a whole.

According to one object of the invention, provided are preforms or filaments that are formed of one or more materials such as but not limited to a thermoplastic, glass, metal, edible material, or other material. In some aspects, a filament or preform contains two or more polymers of differing flow temperature. The two or more materials are optionally in a regular geometric arrangement within the filament or preform cross-section. This arrangement results in a structure optionally with a processing temperature window in which the lower flow temperature (LFT) polymer flows in order to fill voids and form strong weld lines, while the higher flow temperature (HFT) polymer remains mechanically stable to retain dimensional stability. By printing or annealing FFF parts within this processing window, parts with high mechanical and functional properties, as well as reduced surface roughness that also maintain geometric accuracy can be produced.

According to another object of the invention, provided are preforms or filaments with two or more polymers, metals, glasses or other materials of differing optical, electrical or other properties, arranged with geometric precision so that patterns, images, text, symbols, logos, or barcodes are microscopically encoded in the filament or preform cross-section, or to create filaments or preforms with unique optical waveguiding properties.

According to another object of the invention, provided is the use of FFF for creating a filament or preform that can be thermally drawn to create a smaller filament with complex geometric arrangement.

BRIEF DESCRIPTION OF THE DRAWINGS

FIGS. 10A-K, 10M, 11A-L, 13A-D, and 14 depict cross-sections of example preforms or filaments, in which a polymer P1 (lighter shade) surrounds a core of polymer P2 (darker shade). FIGS. 10A, 10B, 10C, and 10D depict are variations in the number of the arms for polymer P2;

FIGS. 10A, 10E, 10F, 10G, 10H, and 10I depict variations in the shape of the arms for polymer P2, including rectangle, triangle, trapezoid, oval, arrow, and offset rectangle shapes;

FIGS. 10A, 10J and 10K, depict variations in the length of the arms for polymer P2 and, by consequence, the thickness of the outer band of polymer P1;

FIGS. 10A and 10M depict variations in the thickness of the arms of polymer P2;

FIGS. 11A, 11B, 11C and 11D depict designs having a common 5-armed theme, with increasing surface coverage of polymer P1;

FIGS. 11E, 11F, 11G and 11H depict designs having a common 5-armed theme, with increasing thickness of the outer ring of polymer P1;

FIGS. 11I, 11J and 11K depict designs with a common 5-armed theme, an outer ring of polymer P1 with consistent thickness, but variations in the thickness of the arms comprising the polymer P2 inclusion;

FIG. 11L shows an extreme case where, rather than P2 forming a sparse geometry in the fiber core, the fiber core instead is fully comprised of polymer P2;

FIG. 12A depicts a typical FFF print head, with a filament fed through a heated zone of uniform diameter to soften or melt the filament, followed by extrusion through a converging die;

FIG. 12B depicts a close-up of the nozzle section showing the desired flow behavior, in which the filament cross-section uniformly reduces in area;

FIG. 12C depicts a close-up of the nozzle section showing abnormal flow behavior, in which the filament cross-section is poorly formed;

FIGS. 13A, 13B, and 13C depict additional filament or preform cross-sections having identical volume fraction of polymer P2; however, the designs in FIGS. 13B and 13C divide polymer P2 into a greater number of smaller diameter inclusions; FIG. 13D shows a combination of a 5-armed design with discrete inclusions.

FIG. 14 depicts additional designs that have been considered as filament and/or pre-form cross-sectional designs;

FIG. 22 is a table that summarizes the relevant geometric characteristics of the filaments used to produce the test specimens;

FIG. 23 is a table that compares the fracture toughness behavior of as-printed specimens, without annealing; and FIG. 24 is a table that compares the fracture toughness behavior of printed specimens that were subsequently annealed.

FIG. 25 is a table that compares the creep rate at 135° C. of parts 3D printed using various filaments.

DETAILED DESCRIPTION

Figure 1A:
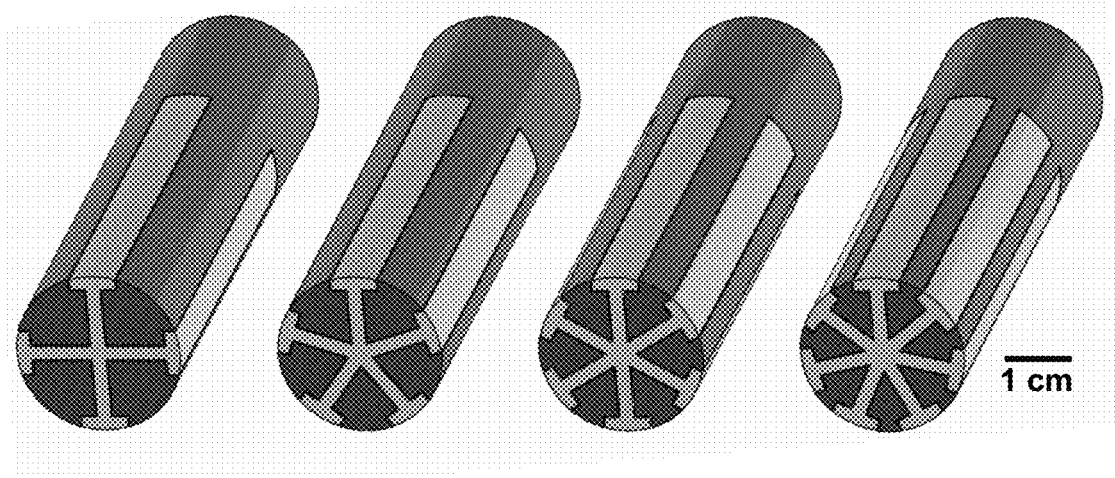
FIG. 1A illustrates four examples of regular geometric arrangements of two differing types of polymers as illustrated and differentiated by shading with the white material illustrating the high flow temperature (HFT) polymer and the darker, gray material illustrating the low flow temperature (LFT) polymer.

The following description of particular aspect(s) is merely exemplary in nature and is in no way intended to limit the scope of the invention, its application, or uses, which may, of course, vary. The invention is described with relation to the non-limiting definitions and terminology included herein. These definitions and terminology are not designed to function as a limitation on the scope or practice of the invention but are presented for illustrative and descriptive purposes only. While the processes or compositions are described as an order of individual steps or using specific materials, it is appreciated that steps or materials may be interchangeable such that the description of the invention may include multiple parts or steps arranged in many ways as is readily appreciated by one of skill in the art.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers, parameters and/or sections, these elements, components, regions, layers, parameters, and/or sections should not be limited by these terms. These terms are only used to distinguish one element, component, region, layer, parameter, or section from another element, component, region, layer, parameter, or section. Thus, "a first element," "component," "region," "layer," "parameter," or "section" discussed below could be termed a second (or other) element, component, region, layer, parameter, or section without departing from the teachings herein.

The terminology used herein is for the purpose of describing particular aspects only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. The term "or a combination thereof" means a combination including at least one of the foregoing elements.

Unless otherwise defined, all terms (including technical and scientific terms) used herein have the same meaning as commonly understood by one of ordinary skill in the art to which this disclosure belongs. It will be further understood that terms such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein the term "regular geometric arrangement" is defined as a constant or defined pattern or patterns with specific and defined spaces between individual instances where the overall geometric arrangement has a repeatability of geometric shape, size, or orientation of one element relative to another element on the same or different device recurring at a fixed interval of distance.

As used herein, the term "periodic geometric arrangement" is a regular geometric arrangement with a specific periodicity of an element shape, size, or other characteristic appearing and/or recurring at a fixed interval or intervals.

As used herein the term "flow temperature" is defined as any characteristic polymer temperature, such as a softening (i.e. $T_g$, glass transition) or melting point that can be used to compare the thermal properties of different polymers and which in part determines appropriate drawing and printing process conditions for a given polymer system.

As used herein the term "physically associated" is defined as in physical contact throughout at least a portion of one element relative to a second element.

As used herein the term "filament" is an elongated material formed by the process of drawing, such as thermal drawing, from a preform to a cross sectional dimension that is less than the corresponding cross-sectional dimension of the preform.

As used herein the term "preform" is a three-dimensional body of two or more materials with differing mechanical, physical, optical, electrical, or other desired properties arranged in a regular or irregular fashion and suitably dimensioned so as to allow the preform to be drawn into the form of a filament.

Provided herein are multi-component materials that are in the form of a preform or a filament useful as an end product or for further processing to form an article such as by methods of three-dimensional printing. By combining two or more materials that differ in one or more properties into the configuration of a preform, the geometric arrangement of the preform is maintained throughout a drawing process so as to produce a filament with desired uses, configurations, or properties that are not easily obtainable by other filament manufacturing methods. A filament as provided herein can be used as an end product itself, can be further drawn into a smaller cross-sectional dimension for other uses or for the manufacture of an article such as by three dimensional printing or other process. A filament has a stable cross-sectional interrelationship between two or more materials that are included in the filament. Such cross-sectional stability is achieved in some aspects by creation of a larger preform with the desired interrelationship and drawing the preform into the form of a filament by a process such as thermal drawing. As such, the interrelationships provided between materials as described herein for a filament are also provided for the description of a preform with the exception of physical dimensions thereof which are larger in a preform. Much of the description is directed to filaments for use in three-dimensional printing, but it is equally appreciated that such filaments are suitable for many other uses and in many other configurations as is appreciated by one of ordinary skill in the art in view of the description provided herein.

In a first embodiment, provided is a filament optionally suitable for use in three-dimensional printing including a first filament material and a second filament material, the first filament material and the second filament material physically associated in a regular or other predetermined geometric arrangement.

In some embodiments, a first filament material or a second filament material are a thermoplastic polymer. Optionally, both a first filament material and a second filament material are differing thermoplastic polymer in which a flow temperature of the first thermoplastic polymer is at least 10 degrees Celsius higher than a flow temperature of the second thermoplastic polymer. A filament thusly composed is suitable as a material source for additive manufacturing processes that create physical models by melt-depositing thermoplastic filaments such as fused filament fabrication (FFF) methods. The filaments provided have the ability to improve association between one layer of printed material and an adjacent layer of printed material, by depositing filament such that the lower flow temperature (LFT) polymer flows in order to fill voids and form strong weld lines, while simultaneously retaining dimensional accuracy due to the mechanical stability of the higher flow temperature (HFT) polymer. This way the regular geometric arrangement of the HFT polymer stabilizes the localization of the LFT polymer to promote geometric confinement of the LFT polymer and overall geometric stability of the resulting article.

In some embodiments, the filament includes two thermoplastic polymer materials that differ in flow temperature by 10° C. or greater. It has been found that in some FFF processes, the upper limit of flow temperature differences should be employed. As such, optionally, the two polymer materials differ in flow temperature by 10° C. to 150° C., optionally 10° C. to 50° C., or any value or range therebetween. Optionally, the two polymer materials differ in flow temperature by 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50° C. Optionally, the two polymer materials differ in flow temperature by 10° C. to 30° C. or any value or range therebetween. The presence of the tailored differing flow temperatures allows for improved weldline strength and geometric stability of the printed article.

A first thermoplastic polymer may be made of the same or differing material(s) as a second thermoplastic polymer as long as the flow temperatures of the two materials differ by at least 10° C. A first or second thermoplastic polymer optionally includes one or more of the following materials: acrylonitrilebutadienestyrene (ABS); high density polyethylene (HDPE); low density polyethylene (LDPE); polyamide (PA also referred to as Nylon); polyamide imide (PAI); polyarylate (PAR); polyaryletherketone (PAEK); polybutylene terephthalate (PBT); polycarbonate (PC); polyester; polyether sulfone (PES); polyetherketoneketone (PEKK); polyetheretherketone (PEEK or PK); polyetherimide (PEI, ULTEM); polyetherketone (PEK); polyetherketonetherketoneketone (PEKEKK); polyethlyene (PE); polyethylene terephthalate (PET); polyimide (PI); polylactic acid (PLA); polymethyl methacrylate (PMMA); polyoxymethylene (POM); polyphenylene oxide (PPO); polyphenylene sulfide (PPS); polyphenylsulfone (PPSU); polyphthalamide (PPA); polyphthalate carbonate (PPC); polyproplyene (PP); polystyrene (PS); polysulfone (PSF); polyurethane (PU); polyvinyl chloride (PVC); polyvinylidene fluoride (PVDF); styrene acrylonitrile (SAN); styrene maleic anhydride (SMA); ultrahigh molecular weight polyethylene (UHMWPE); high impact polystyrene (HIPS); polyvinyl alcohol (PVA); glycol-modified polyethylene terephthalate (PETG); polytetrafluoroethylene (PTFE); thermotropic liquid crystalline polymers such as copolymers of 4-hydroxybenzoic acid (HBA) and 6-hydroxy-2-naphthoic acid (HNA); other thermoplastics, thermoplastic polymers and melt processable polymers.

In some embodiments, a thermoplastic polymer is electrically conductive. Known electrically conductive thermoplastic polymers may be used. The electrically conductive material may be an inherently conductive polymer e.g. polyacetylene or polypyrrole, or a polymer filled with electrically conductive filler to a level giving acceptable conductivity. In some embodiments, the polymer material itself is not electrically conductive such as but not limited to polyurethanes, polyesters, polysulphides, or polyamides, but are combined with one or more electrically conductive fillers to produce an electrically conductive polymer material. The filler may be any solid particulate material having sufficiently high electrical conductivity and having chemical compatibility with the matrix polymer. Illustrative examples include the group of metals commonly used to conduct electricity, for example, aluminum, copper, nickel, silver, gold, tin/lead alloys, etc. or from the group of conductive carbons, for example, carbon black, graphite, graphene, or carbon nanotubes, etc., or, optionally, from the class consisting of acetylene black, for example, Shawinigan acetylene black, UCET acetylene black, etc.

In some embodiments, a filament material includes one or more optical properties. Illustrative optical properties include optical transparency, translucency, fluorescence, phosphorescence, luminescence, or other optical property. Optically transparent is defined as allowing light to pass through the material without being scattered, e.g. light passing through the material follows Snell's law. Optically translucent materials allow light to pass through the material, but some degree of scattering occurs. Illustrative polymeric materials that may be formed to allow light to pass through include polycarbonate, PMMA, PVDF, polypropylene, fluorinated ethylene propylene, polymethylpentene, among others. Other optically transparent materials include glass or other known suitable transparent material. Optically transparent, translucent, fluorescent, phosphorescent or other optical property containing filament materials are optionally used to form a filament in the form of an optical waveguide where light is transmissible along the length of the filament. In some aspects, materials of contrasting index of refraction can be combined to create optical waveguides such as optical fiber.

An optical property is optionally color, optionally visible color where the filament material is optically reflective to light having a wavelength in the visible spectrum—i.e. 390 nm to 700 nm. Optionally, an optical property is color in the UV or IR ranges.

Thermoplastic polymers are obtainable commercially from many sources known in the art or are formed in situ. Illustrative commercial sources include Star Thermoplastics (Broadview, IL) among others.

In some embodiments, a filament material is a scavengable scaffold material that is capable of being selectively degraded or removed when combined with a second or other filament material that is not a scavengable scaffold material. Such scavengable materials are known in the art and may be degraded by either thermal, biological, or chemical methods. Optionally, a scavengable scaffold material is a biodegradable plastic, illustratively polyhydroxyalkanoates (such as poly-3-hydroxybutyrate (PHB), polyhydroxyvalerate (PHV) and polyhydroxyhexanoate (PHH)), polylactic acid (PLA), polybutylene succinate (PBS), polycaprolactone (PCL), polyanhydrides, polyvinyl alcohol, among others. HIPS is an example of a scavengible polymer that can be dissolved in limonene solvent, while a second non-scavengible polymer such as ABS is resistant to dissolution by limonene.

In some embodiments a filament material is a glass. Illustrative examples of a glass include but are not limited to glasses that include silica, alumina, chalcogenide, or phosphate.

In some embodiments, a filament material is or contains a metal. Illustrative examples of a metal include but are not limited to a eutectic metal, metal solder, metal braze, copper, aluminum, steel, stainless steel, titanium, semi-conducting metal, and bulk metallic glass.

In some embodiments, a filament material includes an edible body that includes one or more human or animal edible materials. Illustrative non-limiting examples of an edible body include a sugar, pasta, dough, vegetable paste, fruit paste, food paste, and a pharmaceutical.

In some embodiments, two filament materials are combined in a single filament, but a filament is not necessarily limited to two thermoplastic polymers. Optionally, 3, 4, 5, 6, or more filament materials are combined. Optionally, the geometric arrangement of at least one or more of the filament materials follows a regular or other predetermined geometric arrangement. Optionally, and at least two of the filament materials have a flow temperature that differs by 10° C. or more.

Optionally, a filament includes at least two compositionally different filament materials where at least a portion of the compositionally different materials are present on the outer surface of the filament. Compositionally different polymers are optionally of different chemical composition, optionally including differing types of chemical crosslinks, formed of different precursor materials (i.e. differing length, type, etc.), including differing additives, or of differing linkages. In one illustrative aspect, a first thermoplastic polymer includes poly(methyl methacrylate) (PMMA), and a second thermoplastic polymer includes acrylonitrile butadiene styrene (ABS). Other combinations are readily formed.

A first filament material and a second filament material may be physically associated, optionally in an interlocking manner, optionally in a side by side manner in the longitudinal direction, or other so as to form a single filament. A filament is optionally in the form of a cylinder, a rectangular prism, elongated prism structure with a cross sectional area in the shape of a circle, square, rectangle, trapezoid, hexagon, pentagon, other polygon as desired, or an irregular outer shape of the cross sectional area. A cross sectional shape optionally is continuous throughout the length of a filament. In some embodiments, a cross sectional shape varies along the length of a filament. Variation of a cross sectional shape is optionally non-random so as to form a useful shape. One illustrative example is a circular cross-sectional shape along much of a filament length and terminating in a square cross sectional shape so as to be removably holdable in a filament holder for use in manufacturing processes. A cross sectional shape optionally varies non-randomly such as by design, or by regular and mathematically describable changes.

A filament optionally has a length that is greater than a cross sectional dimension so as to form an elongated shape with a longitudinal dimension.

A filament includes a first thermoplastic polymer that is optionally a high flow temperature thermoplastic polymer (HFT) and a second thermoplastic polymer that is optionally a low flow temperature thermoplastic polymer (LFT). Here the terms "low" and "high" are terms relative to the flow temperature of the other polymer where a LFT polymer has a lower flow temperature than and HFT polymer, and an HFT polymer has a higher flow temperature than a LFT polymer. The HFT and LFT polymers are optionally in a regular geometric arrangement, optionally extending in a longitudinal direction. Illustratively, a regular geometric arrangement is observed when viewing a filament by cross section.

As an illustration, FIG. 1 depicts preforms for creating two-polymer monofilaments illustrating how the materials for the creation of a filament can be arranged and produced. A preform that is thermally drawn to a filament is optionally suitable as feedstock for a three-dimensional printer where a filament is further reduced in cross section during the printing process. As illustrated in FIG. 1A the gray LFT polymer and white HFT polymer are in a regular arrangement with a number of design features. First, the outer faces of the preform show alternating LFT and HFT material in approximately equal proportion. This feature ensures that, when used for FFF parts, there exists opportunity for continuous contact of LFT and HFT polymers throughout the entirety of the printed part, leading to a percolated, mutually interpenetrating geometry. A second feature is that the LFT polymer is interlocked with the HFT polymer so that that LFT polymer is geometrically confined within the preform. This design allows the preform to be drawn to a filament at a temperature where the HFT polymer can be viscously drawn while the LFT polymer is at a much lower viscosity. Without such confinement within the HFT polymer, the LFT polymer would be at such a low viscosity that it would likely break up or separate during drawing. A final feature of the preform is that the HFT polymer is a single continuous body in the preform, while the LFT polymer is arranged as discrete inserts. Because the HFT polymer is continuous, it provides mechanical stability during thermal drawing of the preform and during additive manufacturing of FFF parts. If, instead, the HFT polymer phase was not continuous, the monofilament produced by thermal drawing would likely be less stable mechanically.

Figure 1B:
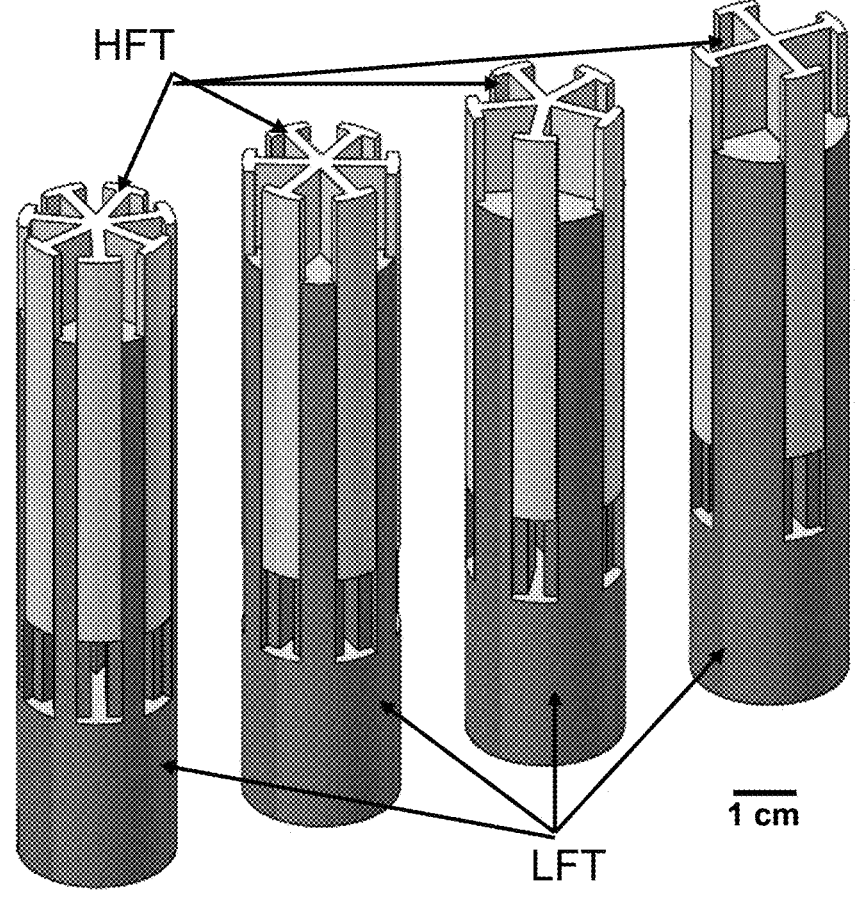
FIG. 1B illustrates regular geometric arrangements of two differing types of polymers as illustrated and differentiated by shading with the white material illustrating the high flow temperature polymer and the gray material illustrating the low flow temperature polymer where the HFT material is depicted as being slid to a final position interlocked with the LFT material.
Figure 1C:
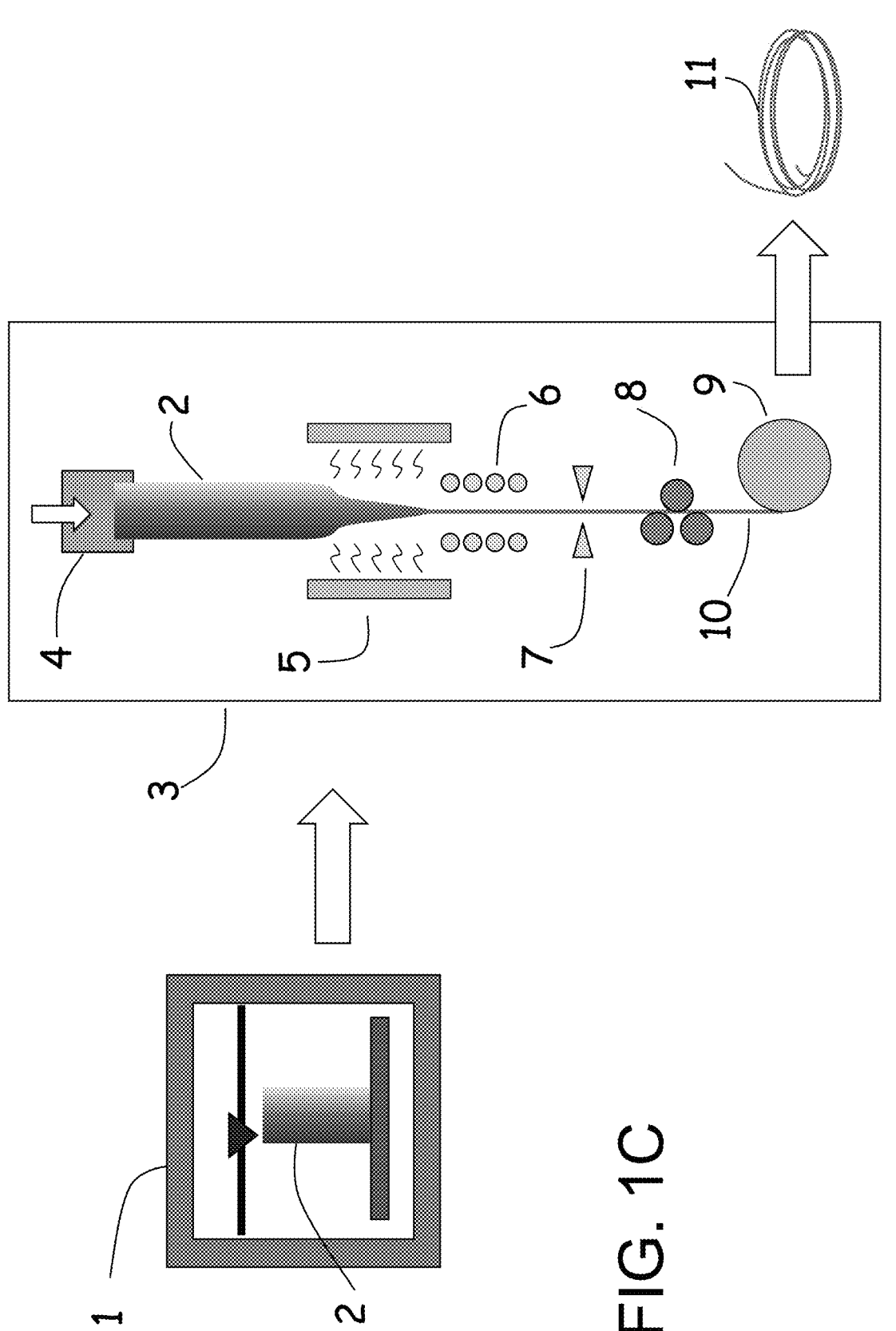
FIG. 1C illustrates an exemplary production method for a filament whereby a preform, optionally made by a three dimensional printing process, is drawn to a filament in a draw tower.

In one exemplary embodiment illustrated in FIG. 1B, the HFT and LFT polymer components are each individually printed (i.e. made) separately and then manually (or by machine) combined into a single, interlocking preform. The base of the preform optionally also includes geometric features such as a tapped hole for mounting into a draw tower. Various degrees of symmetry for the HFT and LFT material may be employed similar to FIG. 1A, e.g. 3-way, 4-way, 5-way, 6-way, and 7-way, can be employed. In the exemplary aspects of FIGS. 1A and 1B, the LFT polymer is acrylonitrile butadiene styrene (ABS), with a glass transition temperature ($T_g$) of approximately 105° C., and the HFT polymer is polycarbonate (PC), with a $T_g$ of approximately 147° C.

In some embodiments, a geometric arrangement is a regular geometric arrangement. In some aspect, the geometric arrangement radially symmetric or symmetric about the long axis of the fiber. A "regular" arrangement includes any geometry which is spatially designed, orderly, and deterministically arranged. Regular geometries include, but are not limited to, geometric patterns, images, text, symbols, logos, or barcodes. Geometries that are not "regular" include random mixtures, and disordered material combinations with significant spatial variations in phase size, shape, and distribution, optionally so as not to form a human or machine cognizable image or unable to convey meaning or data. Illustrative examples of regular arrangements are optionally where the first filament material is oriented, shaped, and positioned in regular, repeating intervals around the circumference of a preform. Such an arrangement is also a periodic geometric arrangement, where a periodic geometric arrangement is defined as a regularly repeating arrangement of one filament material to another filament material in shape, orientation, and location within the filament or a preform.

The first filament material, the second filament material, or both are optionally a single continuous body through a filament length, meaning that the filament material is continually present from one end of a filament to another. Optionally, the single continuous body polymer is an HFT polymer. Optionally, an LFT polymer is not continuous throughout a filament length. Optionally, an LFT polymer has a length that is less than the full length of the filament.

A filament optionally includes a geometry where an HFT filament material at least partially confines an LFT filament material so that the LFT filament material is restricted from release from the filament structure. An exemplary arrangement of such a construction is illustrated in FIGS. 1A and 1B where a white HFT polymer material is shaped to form "T" shaped extensions that prevent the release of the LFT polymer from the overall structure in a direction other than a longitudinal direction. Any shape of an HFT filament material may be suitable for restricting release of the LFT filament material, illustrative, L shape, barbs, curves, or other shape.

A regular geometric arrangement is optionally in the form of human or machine recognizable text, a symbol, pattern, or barcode. As the preform may be made by FFF processes, and the resulting filament may be made by thermal drawing processes, the shapes of the geometric arrangement are not limited and can be readily tailored to any desired shape. One innovative aspect of the filaments is that the shapes can be made in a larger form such as in the form of a preform that is readily made into any desirable shape, and are able to be drawn to a much smaller size in cross sectional dimension while still maintaining the regular geometric pattern and the overall shape and arrangement of the polymers in the material. Thus, a barcode, text, or other geometric shape is able to be greatly reduced in size from an original preform size. A preform is optionally of larger cross-sectional dimension relative to a final filament that is used for FFF processes. Optionally, a preform is between 1.1 and 100 times the cross-sectional dimension.

As such, also provided are preforms. A preform, in some embodiments, is useable as a source for feedstock in devices for FFF manufacturing or other. A preform optionally has a cross sectional dimension of 1-1000 mm, or any value or range therebetween, optionally 5-50 mm, optionally, 10-30 mm. A preform is drawable into a final filament with a smaller cross-sectional dimension relative to the preform where the filament has substantially the same geometrical arrangement in cross section as the preform. A filament optionally has a cross-sectional dimension, that is 0.01-100 mm, or any value or range therebetween. If the filament is to be used as a feedstock for FFF manufacturing devices, it optionally has a cross-sectional dimension of 0.5-5.0 mm, optionally, 1-3 mm. A cross-sectional dimension is a dimension perpendicular to a longitudinal dimension of a filament. Optionally, a cross-sectional dimension is a diameter.

A preform is optionally made by an additive manufacturing process in which material is selectively dispensed through a nozzle or orifice. In general, these systems consist of a three or more axis, computer-controlled gantry, deposition mechanism, feedstock supply and heated build platform. Depending on the material system that is desired for a final part, the deposition mechanism can vary. The thermoplastic feedstock that is utilized in this art is in the form of a continuous filament with a consistent diameter that is typically between 1 mm to 3 mm. For processing of these types of thermoplastic filaments, a rudimentary deposition system consists of a drive train, heating element, and extrusion nozzle. The drive train consists of a motor or motors and a system of gears that feeds the thermoplastic filament through the rest of the process. A heating element creates a zone of elevated temperature that increases the flowability of the thermoplastic as it is forced through the system by the drive train. The thermoplastic continues through an extrusion nozzle that generally has a decreasing diameter along its length. The change in diameter of the extrusion nozzle causes the diameter of the thermoplastic to decrease. In this form of the deposition process the filament that exits the extrusion nozzle has been reduced to a diameter range of 0.05 mm to 0.5 mm. The deposition system can be mounted onto a gantry system that supports the deposition system above a base component. The gantry system allows the deposition system to move relative to the base component along "X," "Y," and "Z" axes. The movement is conducted in a preset order allowing for the fabrication of a three-dimensional structure. The order is generally computer driven based on computer aided design (CAD) software which generates controlled motion paths for the gantry system. The extruded filament is deposited onto the base component line by line to create a layer that is representative of the cross section of the desired three-dimensional part. Another layer is then deposited on top of the first. This iterative process continues until the part is completed.

When the three-dimensional part being fabricated has geometric complexities that require support during build (overhangs, steep angles, or encapsulated volumes) two deposition mechanisms may be used: 1) a deposition system that deposits the modeling material or the product material; 2) a deposition system that deposits a support material (eventually to be washed out, machined off or broken off) to temporarily support said geometric complexities. The heating elements, of at least one deposition mechanism, may be capable of achieving temperatures such that a range of the filament materials with different softening temperatures (i.e. glass transitions temperatures) can be processed through the extrusion nozzle. The diameter of the extrusion nozzle tip's orifice is recommended to be approximately 0.01" (0.254 mm). However, orifice dimensions are arbitrary and only restricted by the desired fidelity of the preform to be fabricated, granted it can be drawn into filament.

A filament or preform is optionally formed by printing the shape in total or in parts. For example, a preform or filament is optionally itself formed by FFF printing processes. In some embodiments, the HFT filament material is formed or printed separately from the LFT material and then the two materials are manually or mechanically slid together for form a single filament or preform. In such embodiments, the geometrical shape and dimensions of the HFT material and the LFT material are compatible such that the two materials may be associated by a physical interaction such that the two materials do not disassociate upon handling. Optionally, the HFT material and the LFT material are printed simultaneously with the geometric arrangement between the materials formed in situ.

In some embodiments, a filament is formed by drawing a preform into a usably dimensioned filament. The filament is optionally formed using a draw tower to thermally draw preforms into a filament, illustratively by a process schematically depicted in FIG. 1C. A preform 2 is optionally itself printed using three-dimensional printing processes on a three-dimensional printer 1 as is readily commercially available. Once the preform is made and optionally fully assembled, it may be placed in a draw tower or other drawing apparatus for the production of a fabricated filament 11. The preform 2 (or 2') is placed into a draw tower 3 that includes feed mechanism for the preform 4, a heat source 5 and a take up spool 9 for collecting the formed filament 10. The preform 2 is preheated and then brought to full draw temperature in a draw tower 3 that includes a heating element 5 such as in the form of a clam shell oven. Shortly after heating and drawing, the filament 10 optionally encounters a chilled coil 6 that quenches the filament to solidify it and prevent further drawing. Upon exiting the chiller, the filament diameter and draw tension are optionally measured using a filament diameter measurement system 7 and, optionally, a filament tension transducer 8 before the filament 10 is collected on a take-up spool 9. The preform may be fed into the heater at a very slow rate, controlled by a screw-driven linear actuator (exemplary feed mechanism 4), and the take-up speed may be controlled by a stepper motor on the take-up spool. The oven temperature, chiller position, feed rate, and take-up rate can all be adjusted to achieve different levels of filament size and quality for fabricated filament 11.

As such, also provided are processes of forming a filament or of manufacturing an item using FFF technologies incorporating a filament with two or more filament materials differing in flow temperature by 10° C. or more. A process includes: additively manufacturing a first filament material and a second filament material; associating the first and the second filament materials optionally in a regular geometric arrangement to create a preform; heating the preform to a drawing temperature; and pulling the preform under tension to draw the preform down to a filament such that the regular geometric arrangement is preserved.

A first filament material is optionally an HFT filament material or an LFT filament material. A second filament material is optionally an HFT filament material or an LFT filament material. The first, second, or both filament materials are optionally formed by extrusion by processes known in the art, or by additive manufacturing such as by printing the individual filament materials in shapes that are complementary so as to be physically and mechanically associated, or are simultaneously printed in a regular geometric pattern to create a preform. Whether the first and second filament materials are formed together simultaneously or separately then physically associated, the shapes of the two (or more) filament materials are complementary so as to physically associate in the regular geometric arrangement.

A preform is optionally heated to a drawing temperature. A drawing temperature is a temperature at which both the filament materials are flowable meaning that a drawing temperature is at or above a flow temperature for the HFT filament material. A drawing temperature is optionally at the flow temperature for an HFT material. In some aspects, drawing at a minimum flow temperature, where the material is very viscous and drawing is performed under high tensile stress, may be used in order to accurately replicate the preform geometry in the final drawn filament with minimal relaxations or distortions due to gravity, surface tension, interfacial tension, or diffusion. A drawing temperature is optionally from equal to the flow temperature of the HFT material to 100° C. higher than the flow temperature of the HFT material.

The final filament is formed by pulling the preform when heated to the drawing temperature. The pulling is optionally under tension to draw the filament down to a cross sectional dimension that is lower than the cross-sectional dimension of the preform, optionally 0.5X to 0.001X the cross sectional dimension of the preform. In all aspects, the geometric pattern of the preform is substantially maintained in the final filament whereby the relative arrangement, shapes and relative dimensions are preserved in the drawing process. In some embodiments, the cross sectional shape of the preform is maintained, but is optionally changed such as from a polygon shape to a substantially circular or oval shape.

Also provided are processes of forming an article. A process optionally includes heating a filament at or above the flow temperature for the HFT material to form a heated filament, optionally reducing the diameter of the filament by extrusion, drawing or other suitable process, and depositing the heated filament in a controlled manner to form a three-dimensional object. The shape of the object is not limited and may be in any shape such as that of a tool, medical device, toy, electronic device or any other shape. In some embodiments, the three-dimensional object is formed using computer control of the way the heated filament is layered in three dimensions. Computer control of such processes is known in the art as illustrated in U.S. Pat. No. 5,362,427.

The filament is optionally heated to the flow temperature of the HFT material, or a suitable temperature above the flow temperature of the HFT material, optionally from 1° C. to 300° C. above the flow temperature of the HFT material.

The combination of at least two filament materials in a geometric pattern, optionally an interlocking geometric pattern allows for exceptional FFF manufacturing methods to be achieved by promoting improved weldline characteristics as well as improved geometric stability of the resulting manufactured article. By varying the type of filament materials used, the overall characteristics such as electrical conductivity, optical properties, physical properties (e.g. hardness), and others can be readily tailored to the individual need of the user while promoting improved structures relative to those previously produced.

The technique of three-dimensional (3D) printing a preform as described herein and drawing into a filament can be used to create logos, text, pictures, bar codes, and other geometrically complex identifiers that persist from the preform to the filament. This technique enables the encoding of such images into the core of a fiber in a way that would not otherwise be possible with conventional extrusion techniques due to the very small scale. Using 3D printing to create the preform also enables a high degree of customization, for example allowing a different bar code to be printed each day or each hour to create custom bar-coded filaments with short lead times. The small size of the filament and cross-section image provides a number of application possibilities. First, such a filament would be advantageous for anti-counterfeiting. A logo or code could be embedded in a filament that is then incorporated into the product, for example knitted into the body of an expensive sneaker or molded into the plastic housing of a critical electronic component. The embedded image would not be obvious to an outside viewer, so a counterfeit product would not be likely to replicate this feature. To check for the pedigree of a product, the original manufacturer would know to extract a certain fiber or cross-section the housing in a special location and look in a microscope to see the embedded logo, image, or code. In a different application, filaments are produced with internal bar codes. The bar codes can be customized for each product run, or day of the week, or even a detail of that particular product. The filament is then included or embedded in the product and provides a permanent physical record of the product information. A user or manufacturer can magnify and image the bar code and scan it to retrieve relevant product information. Such a technique could similarly be used to embed a miniature QR code into a product, which could then be scanned by a user's mobile phone and used to reference a webpage with relevant product information.

The aforementioned technique of 3D printing a preform and drawing into filament can be used to create microfluidic fibers with internal flow channels for the transport of fluids or gasses. Such microfluidic fibers have application as medical microtubing for intravenous or catheter procedures where various medical agents are introduced via each channel to provide a multi-step treatment, and gas flow or vacuum can also be used to further provide physical action at the procedure site. A more complex medical fiber could also include optical waveguides along with microfluidic channels to provide directed light to the procedure site for activating materials or biological responses. Microfluidic fibers can also be used as heat and mass exchangers, for chemical processes or for active thermal management of materials or textiles.

The processes of 3D printing a preform and drawing into filament can be used to create electronically active materials. Applications include fibers that perform energy storage and release, such as: fuel cells, supercapacitors, capacitors, and batteries, including flow batteries; fibers that serve as conductors, coaxial fibers, inductors, or resistors; fibers that serve as sensors including but not limited to chemical, mechanical, and thermal sensors; fibers that can serve as actuators; and fibers that interact with radio frequency (RF) energy to serve as antennas or RFID structures. Such electronic fibers also provide important capabilities for smart textiles, wherein factors such as body temperature, sweat salinity, skin conduction, and muscle flexion are tracked or directly manipulated to monitor or improve user health and fitness.

The process of 3D printing a preform and drawing into filament can be used to create materials with tailored internal and external surface geometries. For example, a textured outer surface for controlled fluid wetting or controlled friction could be created in high detail by printing the geometry into a preform and maintaining the geometry during drawing. Similarly, for internal features, a controlled internal surface geometry can be used to control flow wetting or to control optical properties such as internal light scattering.

The process of 3D printing a preform and drawing into filament can be used to print another preform, which is then drawn into filament and used again for printing. This process of repeated printing and drawing leads to a systematic and significant reduction in the internal material microstructure. For example, this approach can be used to create a "deterministic mixing" protocol for the combination of two or more materials. Consider a 10-mm-diameter preform that is printed with two different materials in a precise geometric relationship. Thermally drawing this preform into 1-mm-diameter filament, and then printing into 0.1-mm-diameter extrudate leads to a 100× reduction in the scale of the microstructure. If the extrudate is printed into a new 10-mm-diameter preform, that is again thermally drawn and extruded from a printer, there would be another 100× reduction in the microstructural scale. With just three cycles of printing and drawing, an original 10-mm material feature would be reduced to 10 nm. Moreover, because the thermal drawing and print extrusion processes are deterministic and generally affine, the mass and volume ratios of the two components should be nearly perfectly maintained at all scales. This process therefore allows for the assembly of 3D parts with perfectly homogenous distribution of two materials. In contrast, conventional compounding and molding processes often lead to internal gradients in structure and mixture ratio. The ability to tailor mixing deterministically could be important for a wide range of materials and applications, such as selective diffusion membranes, pharmaceuticals, and propellants and explosives. This approach may also allow for fine-scaling mixing of incompatible (physical or chemical) materials that would otherwise not be mixable using conventional compounding equipment.

The process of 3D printing a preform and drawing into a filament could also include materials that are intended to be scavenged or otherwise dissolved away from the part. For example, PLA can be thermally or chemically decomposed in the presence of PC without a loss of PC. A preform could be created with both PC and PLA components. The preform could then be drawn into filament, and a subsequent chemical or thermal process used to remove the PLA while leaving the PC intact. This technique could be useful for supporting critical geometric features intact during drawing, such as open channels, finely-detailed features, sharp corners, or thin walls that might otherwise distort or collapse during drawing.

Various aspects of the present invention are illustrated by the following non-limiting examples. The examples are for illustrative purposes and are not a limitation on any practice of the present invention.

EXAMPLES

Example 1

Figure 2B:
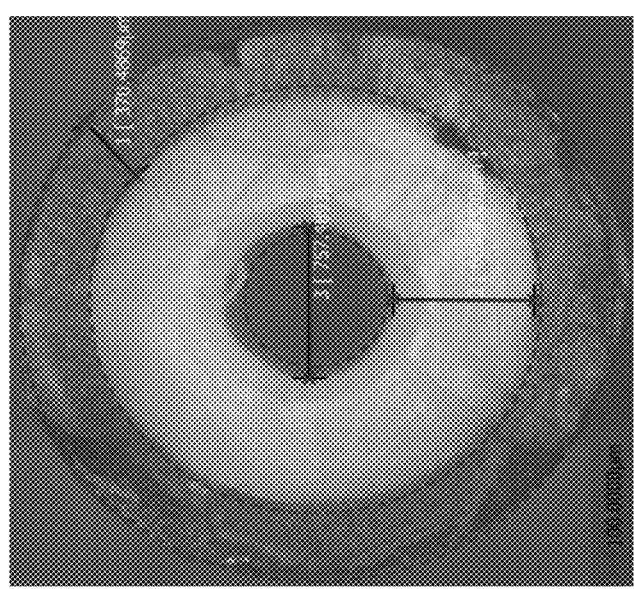
FIG. 2B is a photograph of the preform of FIG. 2A after drawing to a 2.5 mm outer diameter monofilament where the geometry and arrangement of the phases remained consistent with the original preform, with an approximately 10× reduction in scale.
Figure 2A:
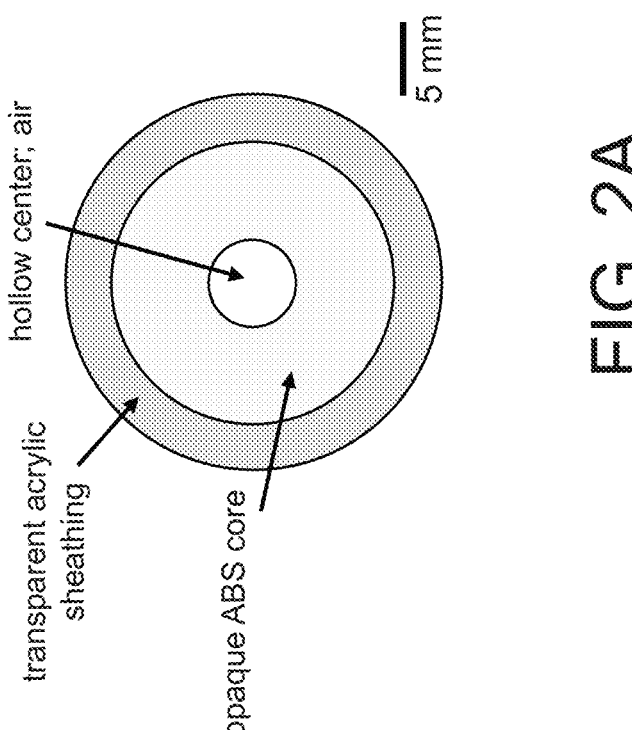
FIG. 2A is a schematic of a preform with a hollow, opaque printed ABS core and an outer, transparent sheath of extruded acrylic (poly(methyl methacrylate) (PMMA))

A preform is made using an acrylonitrile butadiene styrene (ABS) LFT polymer core with a glass transition temperature ($T_g$) of approximately 105° C., and extruded acrylic (PMMA) HFT polymer sheath with a $T_g$ of approximately 125° C. The source materials for the core were obtained from Stratasys (Eden Prarie, MN). The source materials for the extruded acrylic sheath is from McMaster Carr (Robbinsville, NJ). The preform combines a printed ABS core made on a dual-head MAKERBOT REPLICATOR 2X (MAKERBOT Industries, LLC, Brooklyn, NY) inserted within an extruded acrylic tube. The core was sized with some interference so that the fit into the sheath was mechanically tight. The resulting preform is illustrated in FIG. 2A. Thermally drawing this material resulted in monofilament such as shown in FIG. 2B, with an outer diameter of 2.5 mm while accurately replicating the original geometry of the preform. This example shows that dual materials can be co-drawn with this process, and that printed materials can be combined with conventionally extruded materials to create complex preforms. Furthermore, this example shows that hollow features can persist from perform to monofilament.

Example 2

Figure 3B:
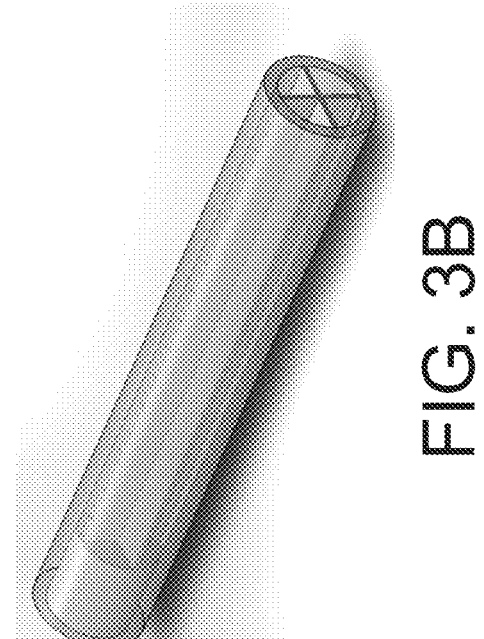
FIG. 3B illustrates a virtual rendition of a preform with a cross-section as shown in FIG. 3A FIG. 3C a photograph of the preform of FIG. 3A after drawing to an approximately 600 μm outer diameter monofilament where the geometry and arrangement of the phases remained consistent with the original preform, with an approximately 40× reduction in scale.
Figure 3A:
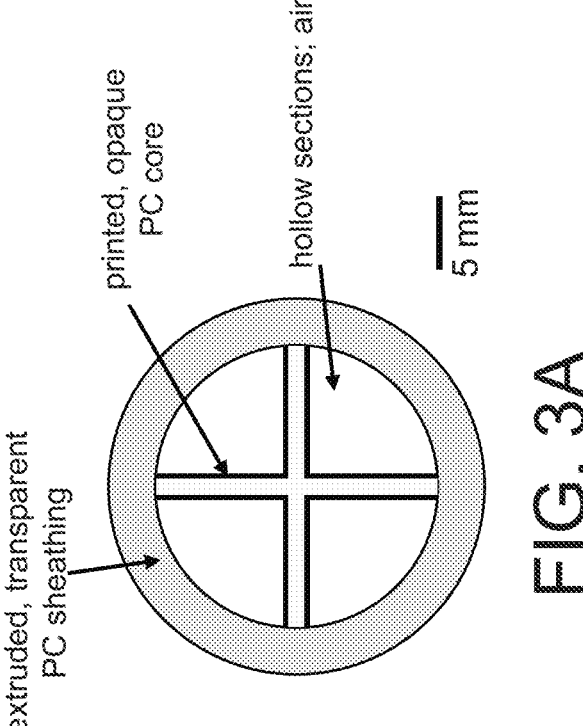
FIG. 3A is a schematic of a preform with an opaque, printed polycarbonate (PC) core in the shape of a cross physically associated within an outer, transparent sheath of extruded PC.

A preform is made using a printed polycarbonate (PC) core and an extruded polycarbonate tube. The source materials for the core were obtained from Stratasys (Eden Prarie, MN), while the extruded polycarbonate tubing is from McMaster Carr (Robbinsville, NJ). The preform combines a printed PC core made on a Stratasys Fortus (Eden Prarier, MN) where the core includes a relatively complex cross shape that is maintained when inserted within an extruded PC tube. The resulting preform is illustrated in FIGS. 3A and B.

Figure 3D:
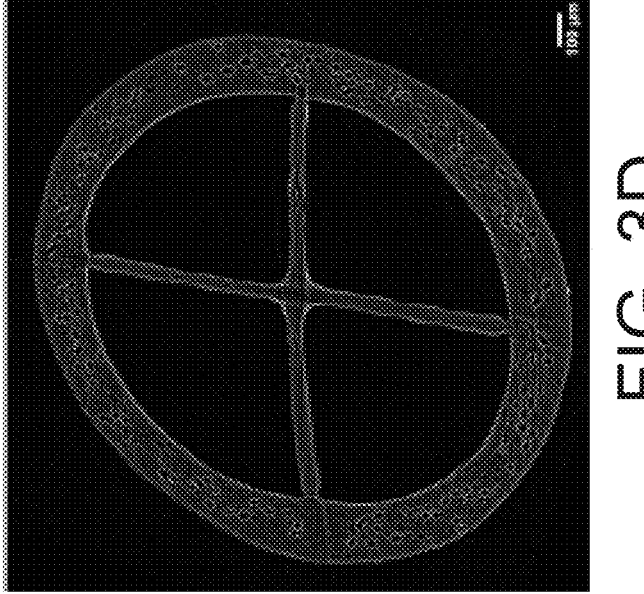
FIG. 3D a micrograph of the preform of FIG. 3A after drawing to an approximately 1.6 mm outer diameter monofilament where the geometry and arrangement of the phases remained consistent with the original preform, with an approximately 16× reduction in scale.
Figure 3C:
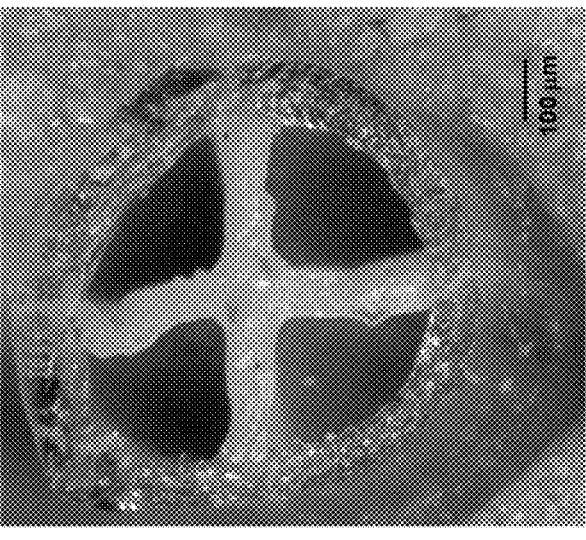

The preform is thermally drawn down to monofilament to create a four-lobed microfluidic fiber with opaque inner walls and an optically transparent outer wall such as shown in FIGS. 3C and 3D, with an outer diameter of approximately 600 µm while accurately replicating the original geometry of the preform. This example shows that dual materials can be co-drawn with this process while maintaining the shape of the original preform and relative dimensions thereof.

Figure 4B:
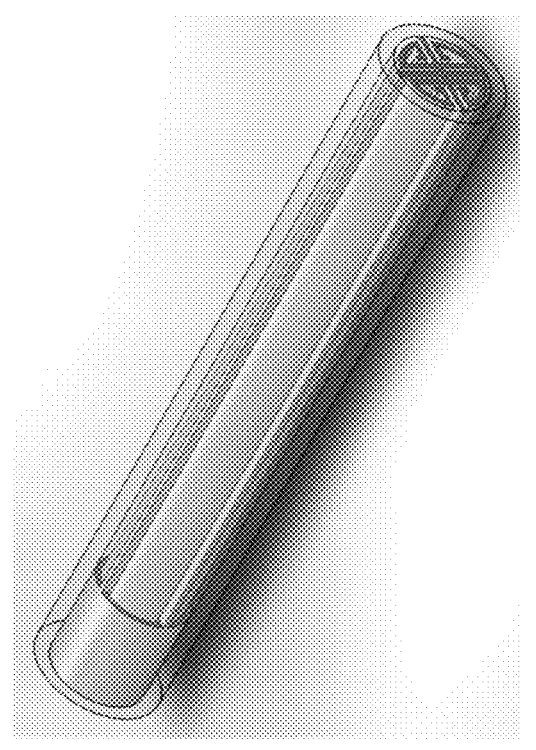
FIG. 4B illustrates a virtual rendition of a preform with a cross-section as shown in FIG. 4A.
Figure 4A:
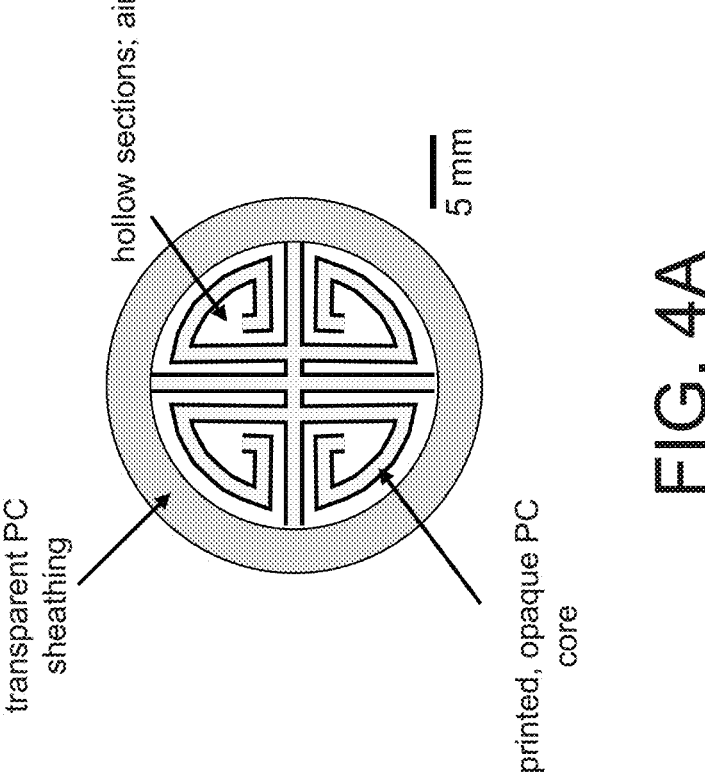
FIG. 4A is a schematic of a preform with a printed core of opaque PC in the shape of a complex pattern physically associated within an outer, transparent sheath of extruded PC.
Figure 4D:
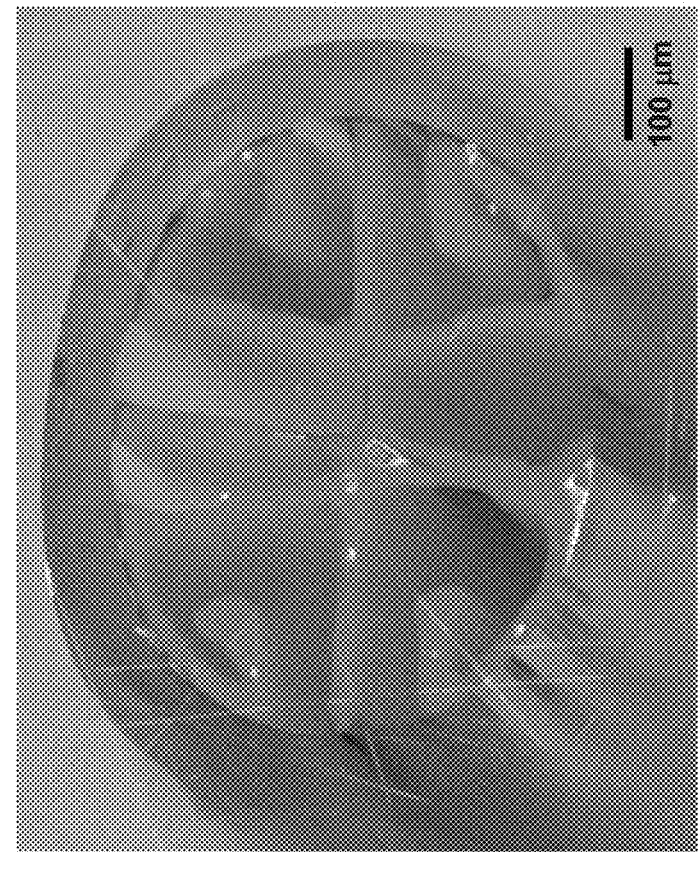
FIG. 4D is photograph of the preform of FIG. 4B after drawing to an approximately 800 μm outer diameter monofilament where the geometry and arrangement of the phases remained consistent with the original preform and showing reduction of 30× in scale.
Figure 4C:
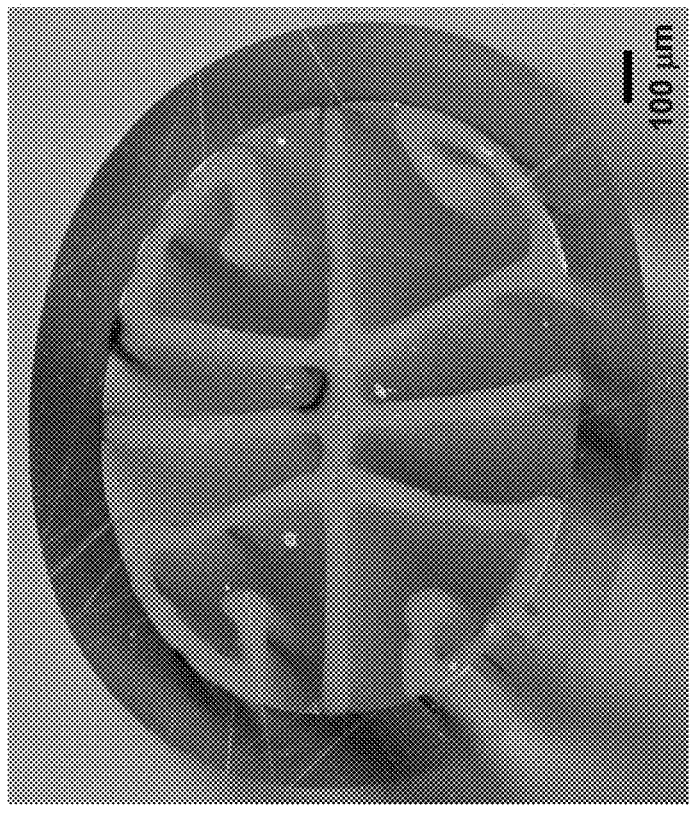
FIG. 4C is a photograph of the preform of FIG. 4B after drawing to an approximately 1.4 mm outer diameter where the geometry and arrangement of the phases remained consistent with the original preform and showing reduction of 17× in scale.

The same processes are used to form more highly complex structures as is illustrated in FIGS. 4A and B. The process produces a four-lobed, spiral-shaped, white, printed PC core is inserted into a transparent extruded PC sheath. The preform is drawn as in Example 1 into a monofilament that, while not a perfect replicate of the original preform, captures the relevant features including multiple flow channels and cantilevered internal wall structures as illustrated in FIGS. 4C and D.

Example 3

Complex interlocking preforms are produced by independently printing by FFF processes two independent interlocking shapes, the LFT polymer is ABS with a glass transition temperature ($T_g$) of approximately 105° C., and the HFT polymer is polycarbonate (PC) with a $T_g$ of approximately 147° C. The individual polymer shapes are printed using a Stratasys Fortus (Eden Prarier, MN). The two components were sized with some interference so that the fit when combined was mechanically tight. The two components are fit together to produce the preform as illustrated in FIG. 5A illustrating the two elements in an intermediately combined state.

Figure 5B:
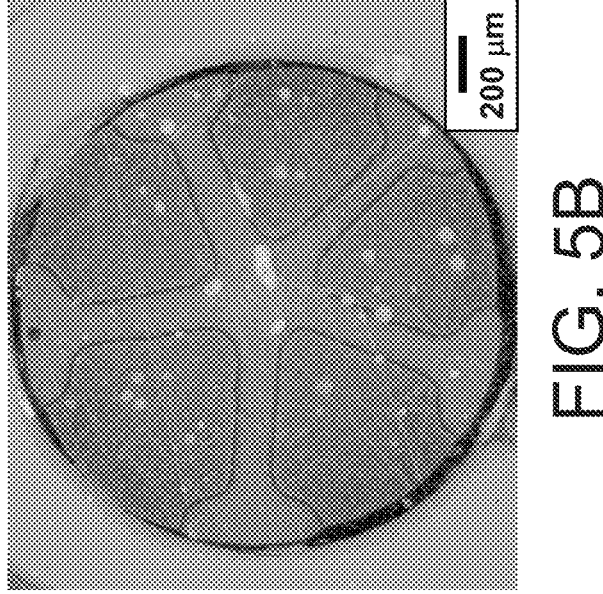
FIG. 5B is a micrograph of the preform of FIG. 5A after drawing to a 1.59 mm outer diameter filament where the geometry and arrangement of the phases remained consistent with the original preform.
Figure 5A:
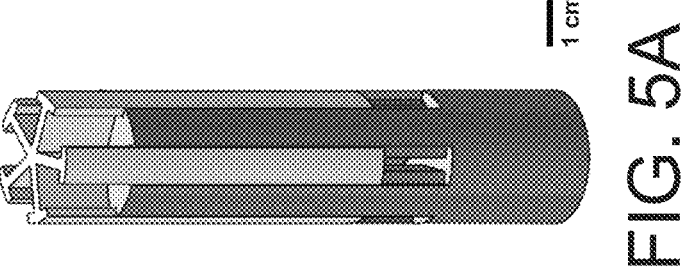
FIG. 5A illustrates regular geometric arrangements of an ABS polymer (gray) as being combined with a PC polymer (white) illustrating an arrangement during the sliding of the PC material into the ABS material following independent manufacture by printing.
Figure 5D:
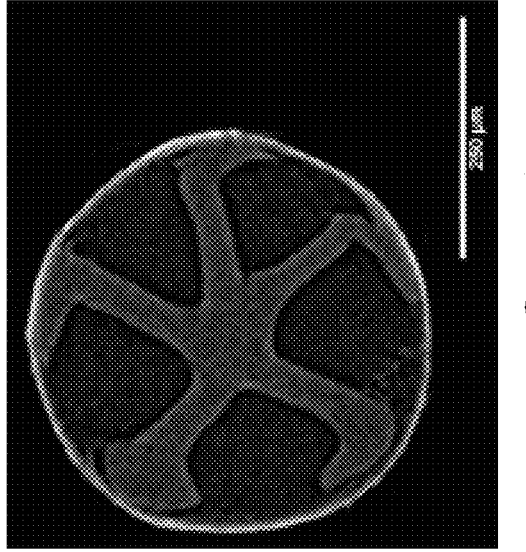
FIG. 5D is a micrograph of the filament of FIG. 5C after extrusion from an FFF print head, resulting in an approximately 400 μm outer diameter extrudate where the geometry and arrangement of the phases remained consistent with the original preform and monofilament used as feedstock.
Figure 5C:
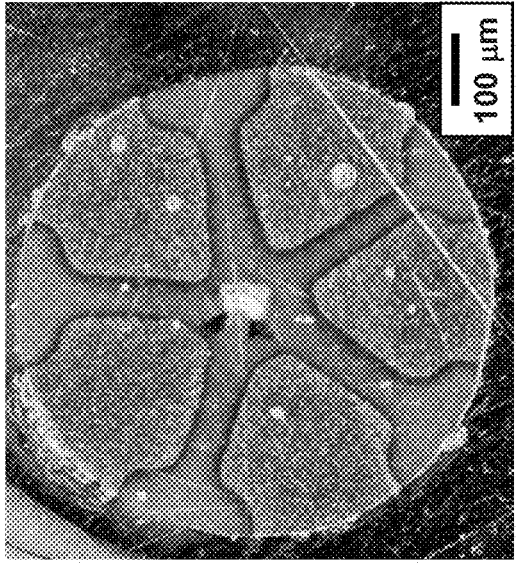
FIG. 5C is a micrograph of the preform of FIG. 5A after drawing to a 0.65 mm outer diameter filament where the geometry and arrangement of the phases remained consistent with the original preform.

The preform is thermally drawn down to a five-lobed monofilament with interlocking polymers as shown in FIG. 5B, with an outer diameter of approximately 1.6 mm while accurately replicating the original geometry of the preform. The preform is thermally drawn to a finer scale, five-lobed filament with interlocking polymers as shown in FIG. 5C, with an outer diameter of approximately 0.65 mm while accurately replicating the original geometry of the preform.

Figure 5E:
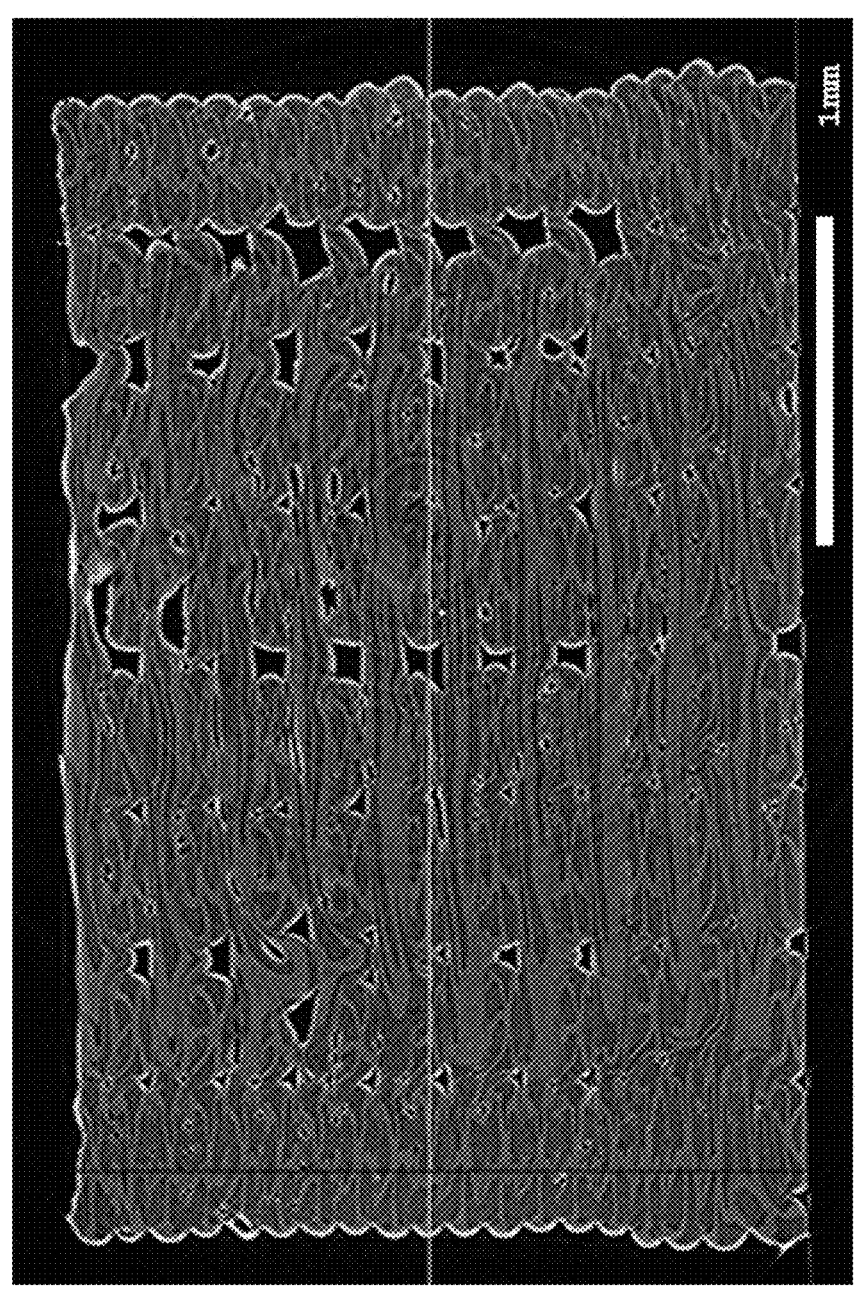
FIG. 5E depicts an exemplary printed article formed by a three dimensional printing process using the filament of FIG. 5C as a feedstock.

The filament is used as a feedstock in a dual-head MAKERBOT REPLICATOR 2X (MAKERBOT Industries, LLC, Brooklyn, NY) and a single material line is printed. The resulting monofilament is sectioned and analyzed as illustrated in FIG. 5D. The major features of the original preform and monofilament are replicated during FFF printing, in this case down to a diameter of 0.4 mm. A full part was printed from this feedstock and sectioned, FIG. 5E. The geometric features of the original feedstock persist into the printed body.

The same monofilament is used in the MAKERBOT printer to print a three dimensional structure in the shape of ASTM D38-IV dogbone missing one of the gripping ends and reduced to half its dimensions about its centroid. An identically shaped and sized structure is printed on the same printer using only the ABS material. The two structures are then positioned adjacent to one another in an enclosed thermal chamber with a transparent façade. A video recording device is normally positioned at an approximately similar elevation to the two printed structures. The thermal enclosure is set to 180° C. and as the temperature rises in the chamber the response of the printed structures is continuously recorded. After an hour at 180° C., the test is concluded. Examination of the recorded images revealed that at a temperature of 168° C., the dogbones printed with ABS-only droop significantly under their weight, while the dogbones printed using ABS+PC dual material monofilament are geometrically stable.

Example 4

Figure 6A:
FIG. 6A illustrates regular geometric arrangements of different colored ABS polymers in the shape of the corporate logo for the Army Research Laboratory (ARL)
Figure 6D:
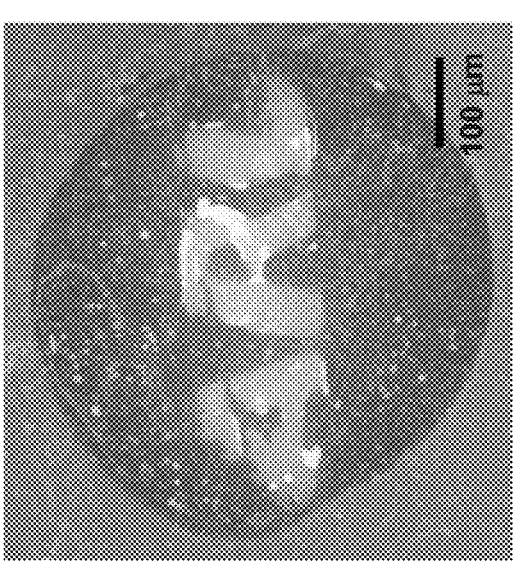
FIG. 6D shows a photograph of a preform with a cross section of the ARL logo after thermal drawing to a 0.52 mm diameter fiber and showing a 49× reduction in scale.
Figure 6C:
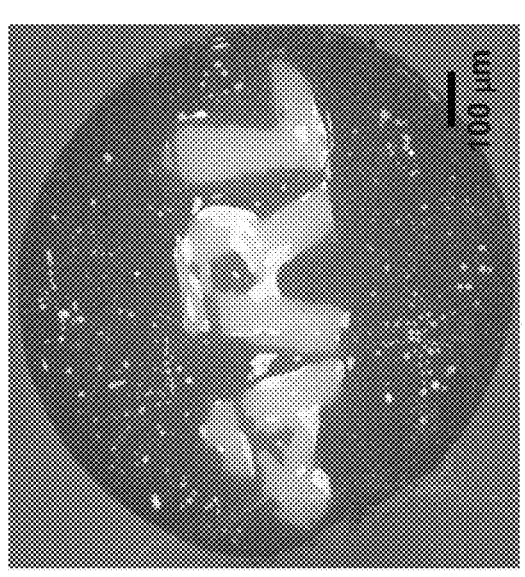
FIG. 6C shows a photograph of a preform with a cross section of the ARL logo after thermal drawing to a 0.95 mm diameter fiber and showing a 27× reduction in scale.
Figure 6B:
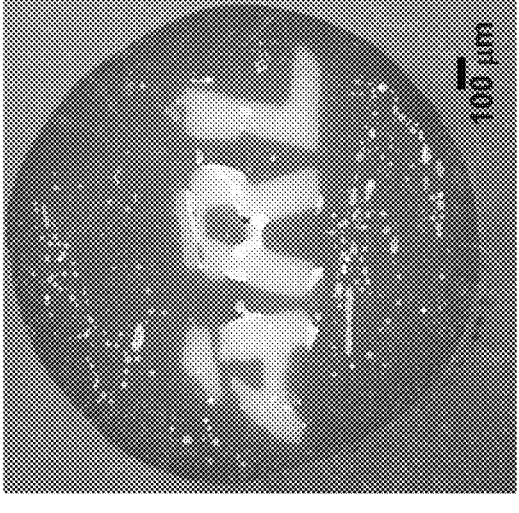
FIG. 6B shows a photograph of a preform with a cross section of the ARL logo after thermal drawing to a 1.5 mm diameter fiber and showing a 17× reduction in scale.

A combined and interconnected preform is created by printing two differently colored ABS materials into a single preform using the dual-head MAKERBOT REPLICATOR 2X, where the printed materials form a corporate logo for the Army Research Laboratory. A preform is illustrated in FIG. 6A. Drawing the preform as in Example 3 to monofilament demonstrates that the logo is reproduced with fidelity at diameters of 1.5 mm as illustrated in FIG. 6B, with smaller diameters possible and illustrated in FIGS. 6C (0.95 mm diameter) and D (0.52 mm diameter). The example shows how one can create a fiber with a logo, special symbol, or information barcode that would be very small in size and only evident if examined with a microscope. Such a fiber could be very useful for branding, labeling, or anti-counterfeit/anti-tamper applications.

Codrawing Embodiment 1: Co-Drawing of Structural or Functional Thread

Figure 7:
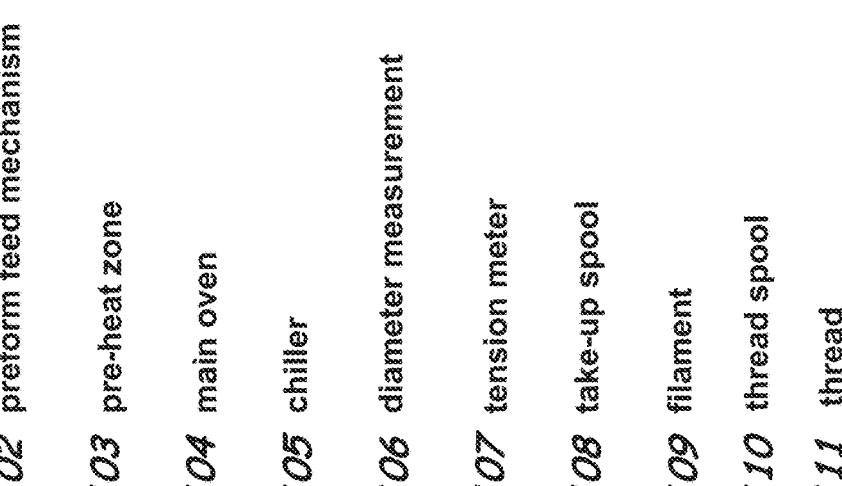
FIG. 7 shows a schematic of an example of co-drawing of structural or functional thread with an additively manufactured preform.
Figure 7:
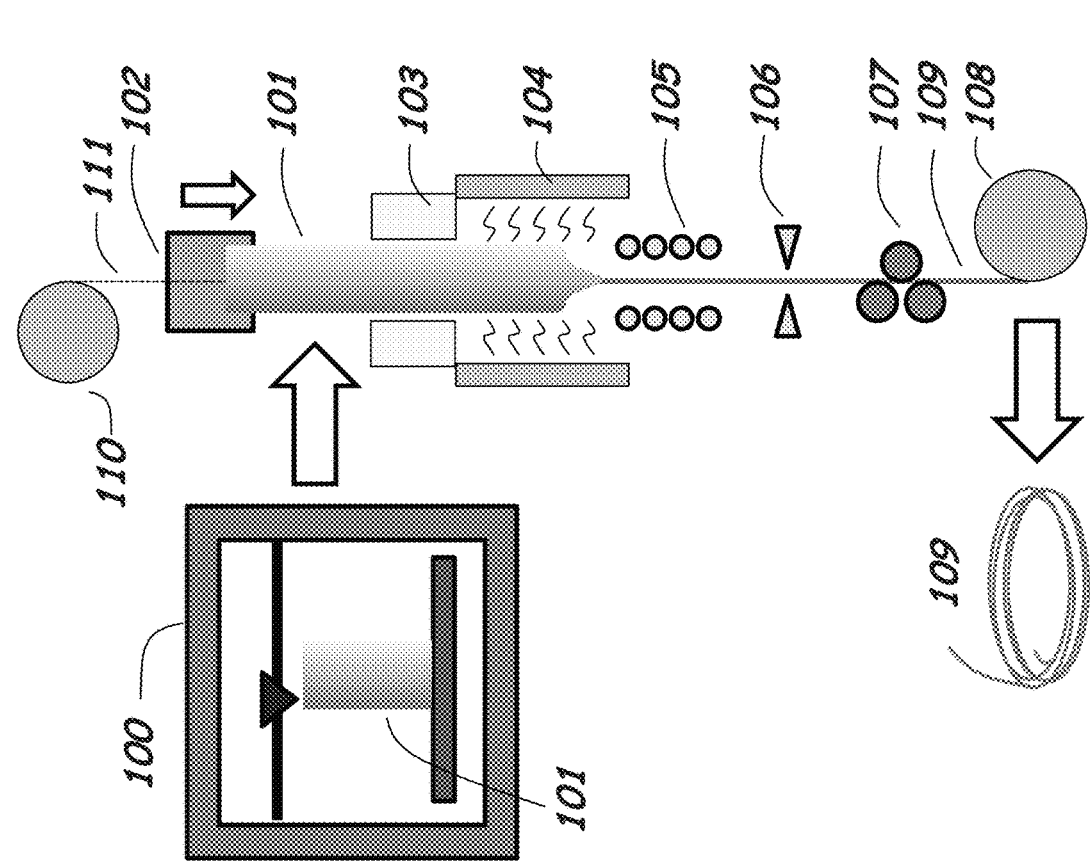

FIG. 7 illustrates an example of how a structural or functional thread 111 can be co-drawn with an additively manufactured (AM) preform 101. In desirable embodiments, the AM preform 101 is printed on a printer 100, such as a fused deposition modeling (FDM) printer, in a regular geometric arrangement such as those illustrated and described above and then loaded into a feed mechanism 102. The preform 101 is designed with at least one internal cavity for accepting the thread 111 which in this illustrated embodiment is supplied from spool 110. As the preform 101 is thermally drawn down to smaller diameter, microstructured filament, in pre-heat zone 103 and main oven 104 the continuous fiber is co-drawn and chilled in chiller 105 before becoming incorporated into the final filament 109. The diameter of the drawn down filament 109 may be measured by a diameter measurement device 106 and/or the tension measured by a tension meter 107 so that the tension and/or diameter may be adjusted as desired. The final filament 109 can incorporated as an element in another product such as medical micro-tubing or collected on take-up spool 108 for later use and/or processing.

As used herein, the term "thread" refers to and includes, but is not limited to, any single filament fiber, multi-filament yarn, solid wire, braided, stranded wire and combinations thereof. The co-drawn, continuous threads could be structural, for example glass, carbon or Kevlar fibers; conductive, for example fine copper wire; or functional, for example glass or polymer optical fiber. Generally, it is desirable for the continuous thread to not melt during drawing, however in some situations melting or flow of the continuous thread could also be advantageous. For example, a thread composed of liquid crystalline aromatic polyester thermoplastic fiber (commercially known as "Vectran"), could be co-drawn with a preform such that the liquid crystalline polymer melts and flows with the preform. Because the liquid crystalline polymer has a propensity to orient during flow, this approach could produce a polymer filament containing highly oriented polymer that would enhance material stiffness and strength.

In certain embodiments the thread may be discontinuous. As used herein, "discontinuous" thread refers to a thread that can be handled as a continuous element, but is composed of many short, discontinuous fibers that are bonded, entangled, twisted or otherwise collected and/or associated to function as an individual thread or yarn.

The thread can enhance the final properties of the filament. For example, glass, carbon, or Kevlar yarns could result in a filament with higher stiffness and strength. Such a material could also be used as a feedstock for subsequent additive manufacturing, for example to enable FDM printing of continuous reinforced thermoplastic. In another example, co-drawing the preform with copper wire can enable the production of an electrically conductive fiber; co-drawing multiple copper wires could enable the expedient generation of an electrical arc at the fiber end, or an electric field along the length of the fiber. Co-drawing optical fiber would enable the incorporation of light waveguiding properties; for example, a filament with both an open flow channel and an encompassed optical fiber could be used to deliver a UV-activated agent (adhesive, chemical, or medicine) and then apply UV light to activate the agent.

The thread could also be used to improve the quality of the draw process. Some materials may melt and flow too readily to be directly thermally drawn as a single material. By including a continuous thread, preferably a continuous thread that does not melt or soften, the continuous thread can provide mechanical stability during draw to enable drawing of materials that otherwise would lose tension and therefore lose stability.

In another embodiment, the thread 111 is comprised of staple or stretch-broken, fibrous yarn. Such materials can be handled as a continuous feedstock but, in fact, consist of short (typically 10-100 mm long) fibers that are entangled, twisted, bonded or otherwise physically interacting. These interactions allow mechanical load transfer between fibers, so that the yarn can be handled as a continuous material. Such staple or stretch-broken yarns could be co-drawn in a manner that does not lead to significant extension of the staple or stretch-broken yarns. Alternatively, it is known that staple or stretch-broken yarns can be "drawn down" into finer denier yarns by subjecting the yarns to extension (analogous to "spinning" of natural fibers such as cotton or wool), which causes inter-fiber shear and translation that reduces the numbers of fibers per cross-section of the yarn. Therefore, in another embodiment, the staple or stretch-broken yarns are co-drawn with the preform in a manner that leads to significant extension of the staple or stretch-broken yarns during the draw process. This embodiment could be advantageous, for example for allowing the yarns to reduce in diameter and linear density as the final filament is reduced to very small diameters.

Example: A 1-inch-diameter, 6-inch-long hollow ABS preform 101 was printed on a Makerbot Replicator 2X and then loaded into a thermal draw tower. Carbon fiber tow was fed through the core of the preform from a spool 110 mounted above the draw tower. The preform was heated in a preheat zone 103 and a main oven 104 to around 200C, at which point the preform end softened and began to fall under its own weight, forming the initial draw cone. The end of the preform was then manually pulled another 12-24 inches, and then the end was cut off so that a smaller diameter filament end remained. At this point in the process, the filament inner diameter was still somewhat larger than the continuous carbon fiber (the carbon fiber could slide within the filament). The end of the filament was then manually pinched to secure the carbon fibers to the filament, and the filament was manually drawn further and wrapped around a take-up spool 108. The take-up spool 108 was then turned on and operated continuously, and continuously drew down the preform to filament while also co-drawing continuous carbon fiber. The take-up speed was gradually increased to reduce the diameter of the produced filament to smaller and smaller values. For creating carbon-fiber reinforced feedstock for FDM printing, the final desirable filament size is 3 mm or 1.75 mm outside diameter, although much finer diameters can also be produced.

Embodiment 2: Direct Integration of 3D Printing with Thermal Drawing

Figure 8:
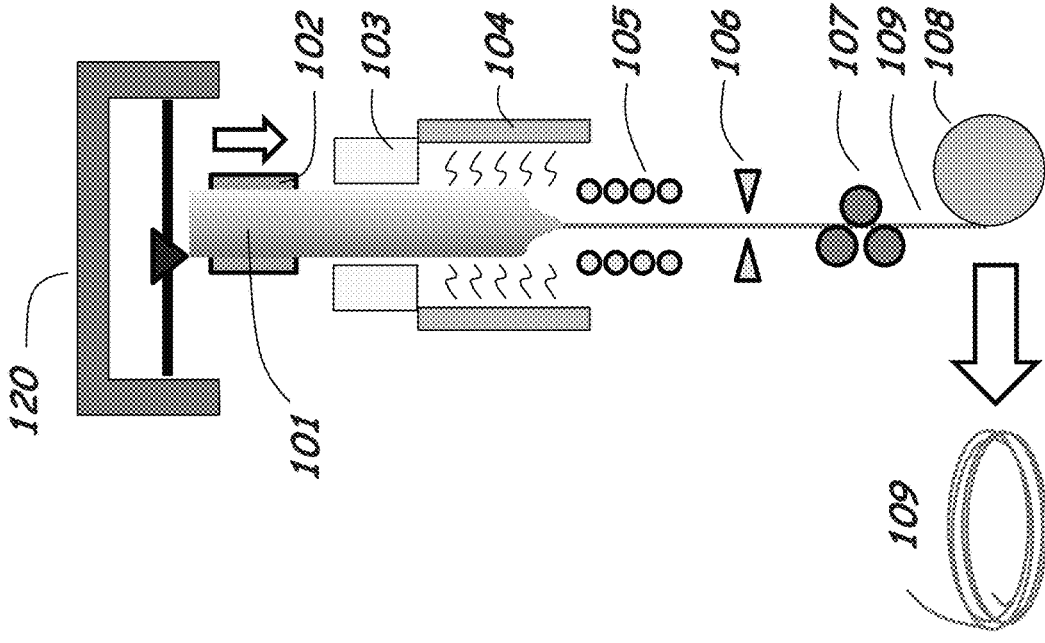
FIG. 8 shows a schematic of an example of integrated additive manufacturing with thermal drawing to filament.

As described above and in the parent patent application, the preform is printed in one device, and then loaded into the thermal draw tower to draw into filament. FIG. 8 shows an improvement to this concept, in which the 3D printer 120 is part of the draw tower and prints the preform 101 layer-by-layer, as needed, for filament 109 production.

For the integration of 3D printing with the draw tower, it will be advantageous to include a feed mechanism 102 that can provide "infinite" feed, in which the preform is continuously or periodically re-gripped so that it can be continuously fed downward. For example, a set of roller or belt feeds could be implemented to provide continuous feed. Alternatively, two or more grips in series could be used in an alternating manner so as one reaches the limit of its feed distance, the other grip takes over to continue the feed while the original grip releases, moves upward, and re-grips to continue the feed.

Similar to FIG. 7, the preform 101 is designed with desired geometric and material configurations. The preform 101 is thermally drawn down to smaller diameter, microstructured filament, in pre-heat zone 103 and main oven 104 and chilled in chiller 105 before becoming the final filament 109. The diameter of the drawn down filament 109 may be measured by a diameter measurement device 106 and/or the tension measured by a tension meter 107 so that the tension and/or diameter may be adjusted as desired. The final filament 109 is collected on take-up spool 108 for later use and/or processing.

The primary advantage of the integration of a 3D printer with the thermal draw tower is that one could, in principle, create infinitely long filaments via this technique. That is, as long as the operator continues to load feedstock material into the printer, the printer can continue to add material to the preform, which can continuously form new filament. In contrast, printing a finite length preform in a separate printer, then loading that finite length preform into the draw tower, would result in a total filament length that is limited by the original volume of the preform.

Another advantage of integrating the printer with the draw tower is that the process becomes more efficient. First, the process is now continuous, rather than batch, so the device can potentially run indefinitely as long as material is continuously provided to the printer. Second, continuous operation eliminates the time and labor associated with start-up, and eliminates the wasted preform material that is consumed during start-up and lost to the end of the preform captured in the feed head. In contrast, once the integrated printer/tower has started and is operating, the device runs indefinitely, and all preform becomes converted to filament with no downtime for startup or switching out preforms.

Another advantage of integrating the printer with the draw tower is that filament can be produced on-demand with very short lead times. For example, if filament is being produced with a microprinted barcode within the filament cross-section, this barcode can be changed every few minutes by simply commanding the printer to change the bar code pattern that it is adding to the preform. This feature could be useful for creating many microprinted fibers in short succession, for example to tag or track multiple products as they are created on an assembly line. Similarly, the on-demand feature would allow a single printer to produce a wide variety of products. For example, the shape of the fiber cross-section, or material composition of the preform, could be changed on-demand without starting or stopping the process. It may be necessary to print "transition zones" where the material or shape is gradually modified to enable continuous drawing without a stop in operations. These transition zones may also be necessary in order to allow time for the process conditions to change, for example to change the draw temperature gradually as the preform materials transition between materials with different softening points.

Finally, the integrated printer with draw tower could allow the facile creation of gradient filaments, by continuously and gradually altering the shape, structure, materials, or combinations thereof in the preform cross-section as it is being produced.

Figure 9:
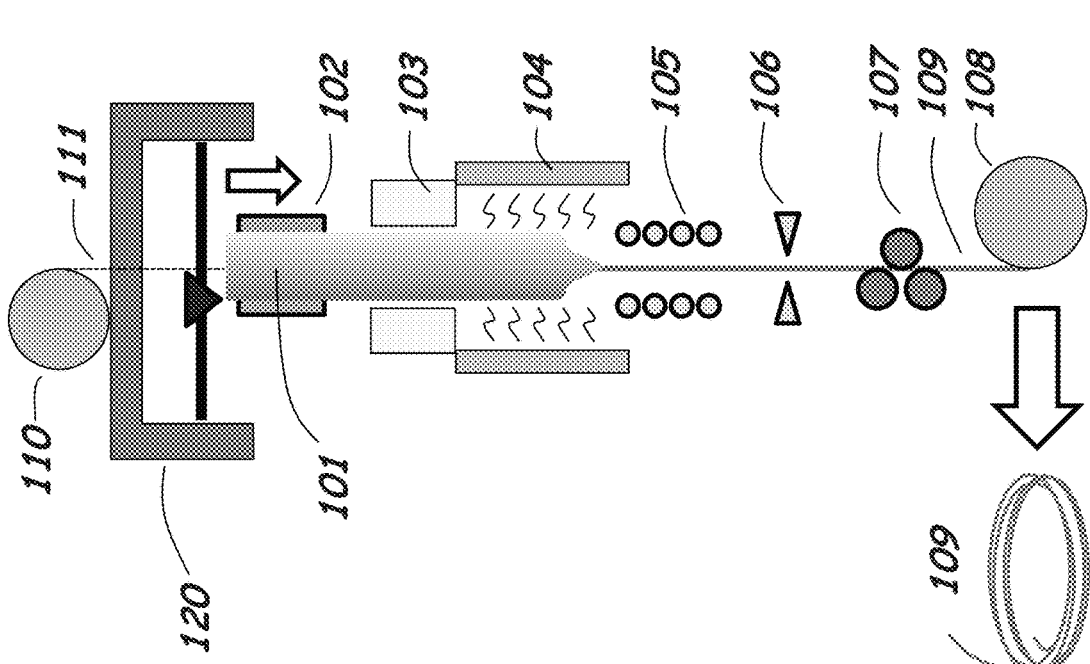
FIG. 9 shows a schematic of an example of integrated additive manufacturing with thermal drawing to filament while co-drawing with structural or functional thread.

Embodiment 3: Direct Integration of 3D Printing with Thermal Drawing, with Co-Drawn Structural or Functional Thread FIG. 9 shows a further improvement, combining the features of codrawn embodiments 1 and 2 above. In this design, both a thread spool 110 and an integrated print head 120 allow for continuous filament production with an included thread 111. This application could be particularly useful when very long fibers lengths are needed, for example for down-hole/drilling applications, undersea cables, buried data transmission lines, or suspended transmission lines. In these situations, it is useful, for example, to have many kilometers of continuous optical fiber embedded with other conductive or structural fibers to create a very long point-to-point communication line. Combining data communication with embedded flow channels could also be useful for material sampling, pressure or vacuum application, or providing chemical or fluidic aids to assist in deep drilling applications.

Similar to FIG. 7, the preform 101 is designed with at least one internal cavity for accepting a thread 111 provided from thread spool 110. Similar to FIG. 8, the 3D printer 120 is part of the draw tower and prints the preform 101 layer-by-layer, as needed, for filament 109 production. The preform is steadily moved downward by the preform feed mechanism 102 and thermally drawn down to smaller diameter, microstructured filament, in pre-heat zone 103 and main oven 104. The thread 111 is co-drawn as filament is produced, integrated with the filament as it is chilled in chiller 105 before becoming incorporated into the final filament 109. The diameter of the drawn down filament 109 may be measured by a diameter measurement device 106 and/or the tension measured by a tension meter 107 so that the tension and/or diameter may be adjusted as desired. The final filament 109 is collected on take-up spool 108 for later use and/or processing.

Further Embodiments of Preforms and Filaments

One embodiment of the disclosed invention is a thermoplastic filament feedstock consisting of two more thermoplastics with differing flow temperatures. As used herein the term "flow temperature" is defined as any characteristic polymer temperature, such as a softening (i.e. $T_g$, glass transition), melting point, or heat deflection temperature that can be used to compare the thermal properties of different polymers and that in part determines appropriate printing or annealing process conditions for a given polymer system. Although the following disclosure specifically focuses on two-polymer systems for descriptive purposes, more material combinations are also envisioned, as described in detail below. In the two-polymer filament, one polymer "P1" has a low flow temperature (LFT) and the other polymer "P2" has a high flow temperature (HFT) above that of P1. The HFT could be only a few degrees Celsius above the LFT, although this scenario would create a very narrow processing window for achieving conditions where P1 is able to flow while P2 is unlikely to flow. Alternatively, the HFT is at least 10° C. greater than the LFT. In some situations, it may be desirable for the HFT to be significantly greater than the LFT, for example by 30° C. or more. If the temperature difference between the HFT and LFT is too large, it is possible that the filament containing HFT and LFT cannot be co-processed.

In the basic process, this filament is fed into a conventional FFF printer, which heats and extrudes the filament onto a build surface to create a three-dimensional thermoplastic part. The part has moderate interlaminar strength. The part is then placed in an oven and annealed at elevated temperature for an extended period of time. The annealing temperature is intermediate between the LFT and HFT of the comprising polymers, so that the LFT polymer P1 can anneal its weldlines to high strength, while the HFT polymer P2 resists creep and thermal deflection to maintain the desired three-dimensional part geometry. Annealing times could be minutes, hours, or days depending on the choice of polymers and annealing temperatures.

In a variation on this process, the LFT and HFT polymers are designed so that the FFF printer deposits the filament at a temperature that enables a high strength weldline to form in-situ, without requiring a post-anneal step. For example, the LFT polymer could be a semi-crystalline polymer that undergoes a dramatic loss in viscosity with temperature, allowing for very fast (less than 1 s) interface healing during FFF deposition, while the HFT is an amorphous polymer that holds shape until one or both polymers cool to a glassy, non-flowable state.

Filaments can be produced via direct extrusion, although specialty dies are required for each filament geometry, and such dies require considerable lead time and expense to produce. A more expedient method of filament manufacture, as discussed above with respect to FIGS. 7, 8 and 9, is thermal drawing. In this process, a cylindrical preform is heated and pulled to produce filament. A typical preform is 25 mm diameter×300 mm long and can be drawn into filament of sizes typically from 0.05-5 mm diameter. A well-designed thermal draw process will produce filament that reproduces the cross-sectional shape and geometrical arrangement of constituents, but at miniature scale. Therefore, the structures that are defined in the preform determine the microstructures of the filament.

The preform can be produced by a variety of methods, such as injection molding or continuous extrusion. However, preforms can be expediently produced using additive manufacturing (AM). AM allows for rapid customization and production of preforms, with complex geometric arrangement and multiple materials with different processing characteristics. FFF processing is an effective approach for preform production, although other thermoplastic AM methods such as selective laser sintering could also be used. Multiple materials can be printed in parallel to produce a multi-material preform via AM, or preform components can be printed or molded separately, and then mechanically combined into a preform.

Geometric Arrangement of Phases Within the Filament

In the simplest implementation, filaments have a circular outside perimeter, which is the shape of standard FFF thermoplastic feedstock, and a necessary shape for the feed and extrusion mechanisms of many printers. However, other filament shapes such as square, triangular, hexagonal, rectangular, ellipsoidal, star-shaped, or flat (ribbon filament) could be considered for specialty printers.

The geometric arrangement of the phases in the filament are important considerations for successful implementation and properties. First, the filament must be manufacturable. Although a wide variety of arrangements are possible, simpler geometries will generally be easier and less costly to produce. If thermal drawing is used to produce the filament, then additional constraints may be imposed. For example, geometric shapes that are interlocking are more likely to thermally draw in a homogenous manner, whereas shapes that are not interlocking could separate during thermal draw due to difference in the thermorheological properties of P1 and P2. Additional benefit may be derived from having interlocking shapes where each phase is contiguous, so they are less likely to separate during thermal draw.

A second requirement is that the filament can be advanced through a conventional FFF feed mechanism and extruded through a conventional FFF nozzle. A common problem with FFF printing is nozzle clogging, which can be caused by incorrect print parameters, dirt and debris, or low-quality filament. Typical nozzles consist of a constant diameter section for heating and flow, followed by a converging section that imparts shear and elongational flow to reduce the material diameter. For multi-material filament with polymers P1 and P2 with differing flow temperatures, nozzle clogging can be a particular concern. For both materials to extrude, the deposition temperature must be above the flow temperatures of both polymers. Typically, at this temperature, the viscosity of P2 will be considerably higher than the viscosity of P1, potentially leading to a range of challenges including inhomogeneous flow, phase segregation, and recirculation. For example, if the periphery of the preform is mostly P1, while the core is mostly P2, then P1 may "lubricate" the nozzle, causing preferential flow of P2 and entrainment of P1 within the nozzle. The resulting extrudate will not maintain the geometric arrangement of the original filament, leading to inconsistent extrudate diameter and poor print quality. In addition, the entrained P1 in the nozzle will recirculate and eventually degrade, clogging the nozzle.

A number of filament design strategies can be used to minimize these effects. First, a design in which the outer surface of the filament includes both P1 and P2 phases ensures that the walls of the nozzle directly act on the more viscous P2 phase, forcing it to contract during the converging section of the die. However, for achieving high strength, it may be desirable to reduce the presence of P2 on the filament outer surface. Therefore, designs in which the P2 phase terminates at a sharp tip at the perimeter of the filament can offer a reasonable compromise, in which the outer surface of the filament is mostly P1, but the P2 phase makes contact with the walls of the die.

It may be further desirable for the P1 phase to form a band of material of finite thickness around the perimeter of the cross-section, for maximum availability for subsequent flow and annealing. In this situation, if the core of the fiber is a solid body of P2 with significant diameter relative to the filament diameter—for example, a simple coaxial filament with a round P2 core and an annular ring of P1—then poor extrusion and nozzle clogging are likely. To improve extrusion, a "sparse" design for the P2 core is helpful. That is, for a single contiguous core of P2, considering an area defined by a circumscribed circle around the contiguous shape, the volume fraction of P2 within the circumscribed circle is preferably less than 75%, or more preferably less than 50%. A sparser P2 shape is easier to compact and shear through the converging nozzle, compared to a fully dense P2 core such as a circular core in a coaxial filament.

The geometric arrangement of the phases in the filament also needs to encourage healing of interfaces to form high strength bonds. To achieve this goal, first it is desirable for the outer surface of the filament to be mostly composed of P1 for example greater than 50% of the outer surface, preferably at least 60% of the outer surface, more preferably at least 70% of the outer surface, still more preferably at least 80% of the outer surface, and, even more preferably, at least 90% of the outer surface of the filament should consist of P1. Having P1 present on the surface of the filament increases the likelihood that adjacent layers of deposited extrudate will achieve direct contact between their respective P1 surfaces, allowing healing to occur at that P1-to-P1 interface during annealing. Further enhancements in strength development are possible if the P1 phase forms a continuous outer band of material in the filament with a finite thickness. This outer band of P1 ensures that adjacent layers of extrudate will form direct P1-to-P1 interfaces and provides a significant volume of P1 that is available for flow during the wetting and healing of the interlaminar interfaces. Preferably, the thickness of this outer band of material is at least 10% of the radius of the filament.

In addition, the geometric arrangement of the phases in the filament must result in the P2 phase forming a structural "skeleton" that prevents creep and sagging of the three-dimensional shape of the part during annealing. Arrangements in which P2 forms part of the outer surface of the filament, or at least makes contact at one or more points along the outer surface of the filament, could result in a more stable structure.

Taken together, all of these factors influence the selection of geometric arrangements for the polymers P1 and P2 in the filament. Some factors are conflicting, for example a thicker outer band of P1 enhances strength development during annealing but can increase the likelihood of unsatisfactory behavior in the extrusion head. Therefore, optimal designs may require a balancing of these design factors, and different designs may be optimal for different material pairings.

Other Material Combinations Within the Filament

In some cases, it may be advantageous to combine more than two polymers into a single filament. For example, polymers P1 and P2 may be optimized for achieving high strength parts, as described above. A third polymer, P3, might be included in the filament to address surface finish. In this example, P3 is selected to have a very low viscosity during annealing, so that it readily softens, flows, and wets the surface of the part to create a smooth surface. This polymer P3 alone would be challenging to print due to its low viscosity, and impossible to anneal to a smooth finish because it would completely lose shape during annealing. But, by combining polymer P3 with P1 and P2, the P1 and P2 polymers serve to support P3 during deposition and annealing.

Polymers P1 and P2 can be both amorphous, both semi-crystalline, or one amorphous and one semi-crystalline. Amorphous polymers undergo a more gradual reduction in viscosity with temperature, so they are easier to control and produce a consistent part with good geometric control. Semi-crystalline polymers tend to be more solvent resistant than amorphous polymers. Due to their rapid drop in viscosity with temperature, they can be more challenging to print and anneal but will form strong interlayer bonds with less time. Combining amorphous and semi-crystalline materials offers the potential for wide deposition processing windows, with high strength interlaminar bonds. In fact, filaments with a well-designed geometric arrangement of amorphous and semicrystalline polymer may be able to form high strength bonds during FFF printing, without requiring a post-anneal process.

Other viscous materials, such as foods and inorganic glasses, can also be combined and printed according to the methods described herein.

Example Structures

FIGS. 10A-K and 10M show several exemplary, but not inclusive, structures. The schematics represent a cross-sectional view of a round filament. Typical filament diameters for FFF printing are 1.75 mm and 3 mm. In these schematics, the LFT polymer P1 is light gray, and the HFT polymer P2 is black.

FIG. 10A shows a design that meets many of design criteria. The outer surface of the fiber is fully covered with P1, and there is an outer band of P1 with thickness greater than 10% of the filament radius. These features lead to high strength during annealing. The P2 core is star shaped, with a central node and 5 extending arms. The sparseness of this core results in consistent homogenous extrusion from the print nozzle, unlike a simple coaxial design. The size and shape of the P2 core are also likely to be sufficient to provide good support during annealing of the part, so that the part geometry is maintained. The P1 and P2 shapes are interlocking and each one is contiguous, allowing consistent and straightforward production from a thermally drawn preform.

FIGS. 10A, 10B, 10C, and 10D show variations in the number of arms, varying from 3 to 6. Changing the number of arms can be used to tailor the overall behaviors of the filament and printed part.

FIGS. 10A and 10E, 10F, 10G, 10H, and 10I show variations in the shape of the arms, including rectangle, triangle, trapezoid, oval, arrow, and offset rectangle shapes.

FIGS. 10A, 10J and 10K show variations in the length of the arms and, by consequence, the thickness of the outer band of polymer P1.

FIGS. 10A and 10M show variations in the thickness of the arms.

FIGS. 11A-L illustrates some of the critical, quantifiable design variables. In FIGS. 11A, 11B, 11C and 11D, all designs have a common 5-armed theme. However, the surface coverage of polymer P1, defined as the percentage of the perimeter length of the cross-section that is populated by polymer P1, varies from 50%-100%. Increased surface coverage of polymer P1 encourages the formation of strong inter-layer bonding, as there is more likelihood of direct contact between P1 domains between layers.

FIGS. 11E, 11F, 11G, and 11H have a common 5-armed theme with consistent arm width. However, designs 11F, 11G, and 11H include an outer band of polymer P1 with a finite thickness. The band thickness is expressed as a percentage of the total radius of the filament and can vary from 0% to 59%. This outer band of P1 ensures both good contact between P1 domains between print layers, and the availability of a volume of P1 that can readily flow, wet, and anneal without significant restriction from polymer P2.

FIGS. 11I, 11J, and 11K show designs with a common 5-armed theme, an outer ring of polymer P1 with consistent thickness, but variations in the width of the arms comprising the polymer P2 inclusion. This variation can be quantified by considering an area defined by a circumscribed circle around polymer P2 (the dashed circle in FIGS. 11I, 11J and 11K). The area fraction of polymer P2 within this circumscribed circle can vary from 15% to 42%. It is desirable for the volume fraction of polymer P2 to be small enough so that the filament can be uniformly reduced in cross-sectional area as it travels through the converging section of the extrusion nozzle.

FIG. 11L shows an extreme case where, rather than P2 forming a sparse geometry in the fiber core, the fiber core instead is fully comprised of polymer P2. This coaxial design can present some challenges during manufacturing, as illustrated in FIG. 12. FIG. 12A shows a typical FFF print head, with a filament fed through a heated zone of uniform diameter to soften or melt the filament, followed by extrusion through a converging die. FIG. 12B shows a close-up of the nozzle section showing the desired flow behavior, in which the filament cross-section uniformly reduces in area. In this desired flow behavior, the proportion of polymer P1 to P2 remains constant from filament through extrudate. In contrast, FIG. 12C shows a flow behavior that might instead be experienced for this filament. Because polymer P2 will have a higher viscosity than polymer P1 when they are heated in the print head to a similar temperature, P2 will have a higher resistance to flow. Consequently, as the inner walls of the nozzle push on the filament during the converging section of the die, it is possible that polymer P2 undergoes less reduction in diameter compared to the ideal flow scenario. This effect blocks some of P1 from entering the nozzle, leading to a reversal flow for some of P1 and recirculation of polymer P1 in the print head. This effect leads to uneven extrudate flow. Furthermore, polymer P1 can accumulate inside the print head and degrade thermally due to excess residence time, leading to head fouling that further impedes smooth extrudate flow and can lead to a clogged head. For these reasons, it is desirable for the core polymer P2 to have a sparser design, as shown in FIGS. 11I, 11J, and 11K, so that the core can be more easily deformed in the converging die section, enabling smooth extrudate flow and minimizing the likelihood of clogging.

FIGS. 13A-D show yet other filament designs. FIG. 13A is a coaxial design in which the diameter of the P2 polymer core is smaller than the design in FIG. 11L, in order to lessen the likelihood of nozzle clogging. The designs in FIGS. 13A, 13B, and 13C have identical volume fraction of polymer P2. However, the designs in FIGS. 13B and 13C divide polymer P2 into a greater number of smaller diameter inclusions. This strategy may be effective at reducing nozzle clogging, as it makes it easier for polymer P2 to rearrange to accommodate the converging section of the nozzle. While suitable for the present application, these designs may be less preferred compared to designs such as shown in FIG. 10A, in which polymer P2 is contiguous. A contiguous polymer P2 shape is more likely to draw and print consistently, and provide geometric stability during annealing, compared to an array of discrete shapes. A hybrid design is shown in FIG. 13D, in which a contiguous star-shaped P2 inclusion is combined with an array of discrete P2 inclusions. The proportions and geometries of the P2 inclusions can be varied to achieve a balance of printability, annealability, and stability during annealing, depending on the details of the application, printer, and polymer thermorheological properties.

Figure 14:
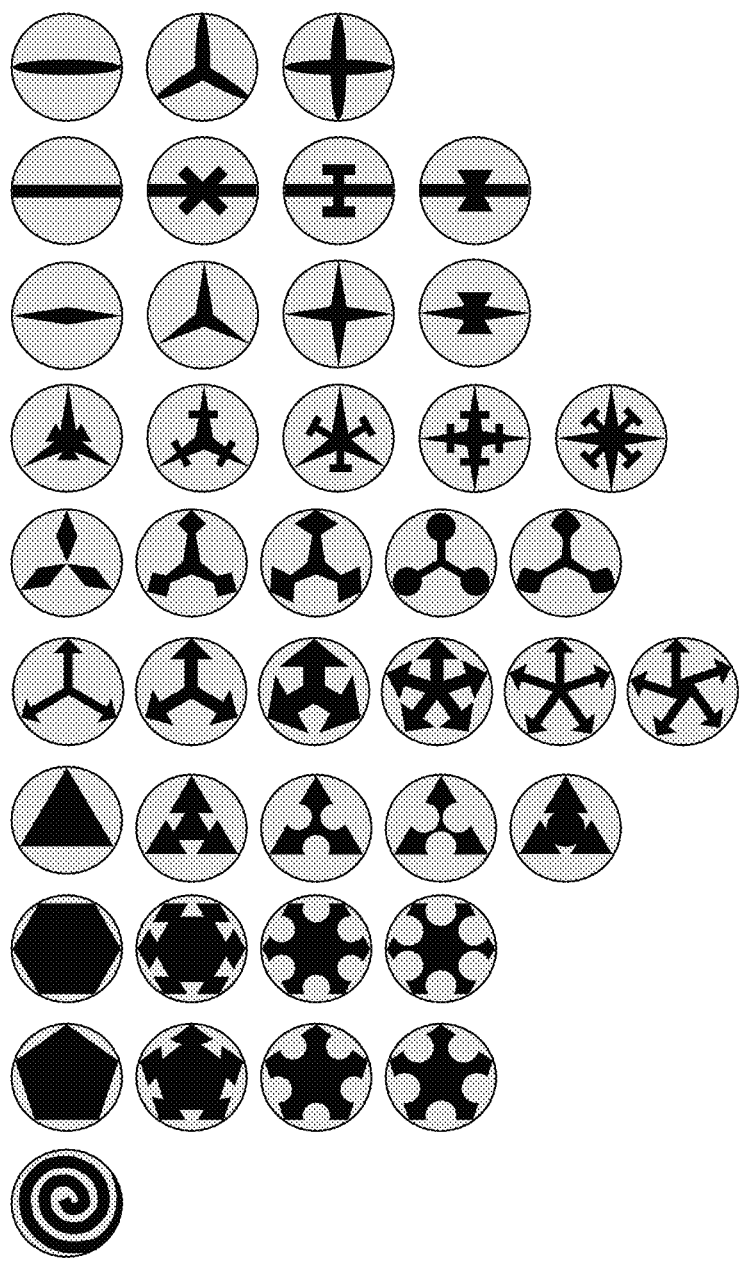
Figure 15A:
FIGS. 15A, 15B, 15C, 15D, 15E, 15F, 15G and 15H depict eight dual-material filaments that were experimentally fabricated and tested, labeled X1-X8.
Figure 15B:
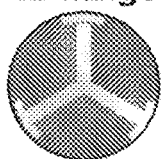
Figure 15C:
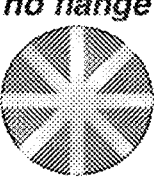
Figure 15D:
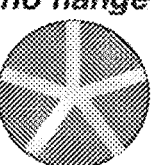
Figure 15E:
Figure 15F:
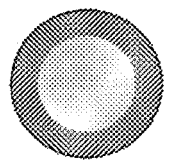
Figure 15G:
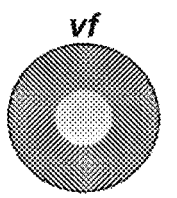
Figure 15H:
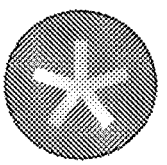

FIG. 14 shows additional designs that have been considered. These designs contain a wide variation in number of arms, arm lengths, and interlocking features. These schematics do not include an outer band of polymer P1 with thickness of at least 10% of the radius of the filament; however, one could create variations on each of these designs that includes an outer band of polymer P1 with thickness at least 10% of the radius of the filament.

Fracture Toughness and Creep Testing

To demonstrate the superior properties of the materials described herein, FIGS. 15A, 15B, 15C, 15D, 15E, 15F, 15G and 15H show eight dual-material filaments that were experimentally fabricated and tested, labeled X1-X8. In these schematics, the lighter toned material, P2, is polycarbonate (PC) and the darker toned material, P1, is acrylonitrile butadiene styrene (ABS).

Figure 16:
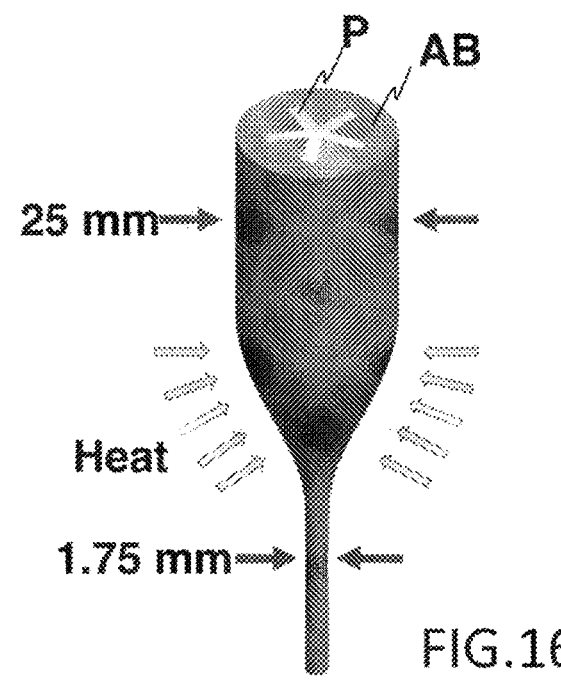
FIG. 16 depicts a schematic view of a preform being transformed into filament within a draw tower, representative of the method used to produce the various filaments shown herein.
Figure 17:
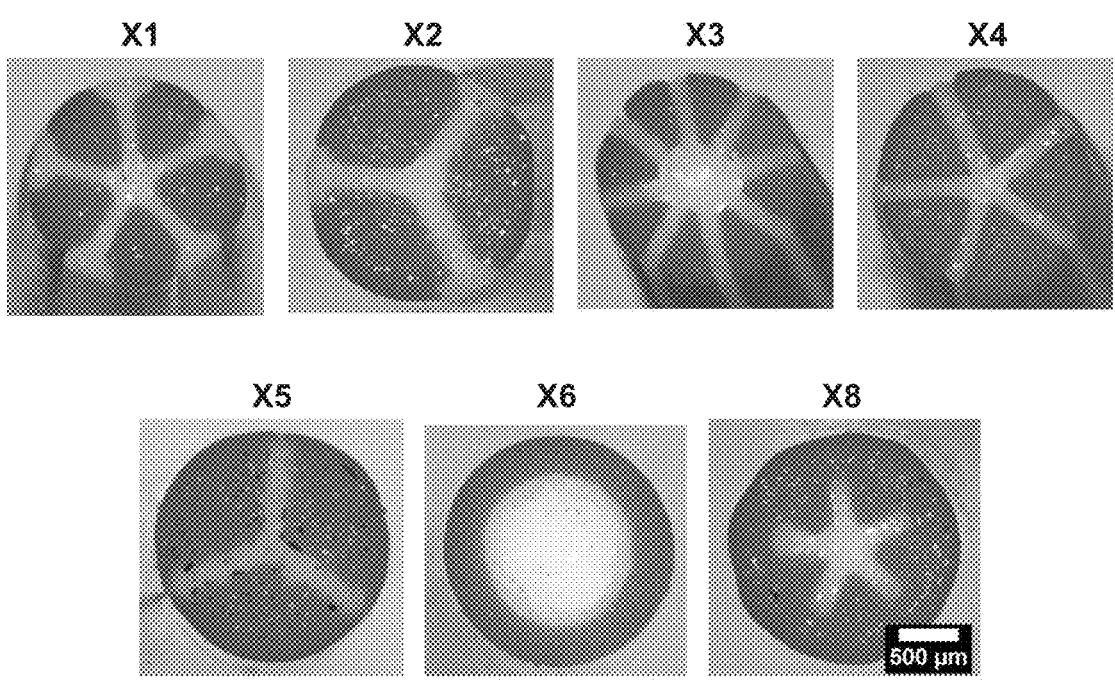
FIG. 17 depicts micrographs of filaments X1-X8, where the lighter toned material is PC and the darker toned material is ABS.

To create these filaments, preforms 25 mm in diameter and 300 mm in length were printed using a Lulzbot Taz6 printer (Loveland, Co.) with a layer height of 0.22 mm and a bed temperature of 110° C. Preforms were printed to match the cross-sectional geometries as shown in FIGS. 15A, 15B, 15C, 15D, 15E, 15F, 15G and 15H. The print materials were "PC-10" PC FDM filament from Stratasys Inc. (Eden Prairie, MN) and "ABS-M30" ABS FDM filament from Stratasys Inc., with $T_g$'s respectively of approximately 150° C. and 100° C. After the preforms were printed, they were thermally drawn in a three-zone, custom-made draw tower at a draw temperature of approximately 250° C. to create continuous lengths of 1.75 mm filament, as schematized in FIG. 16. The custom-made draw tower and the thermal drawing process are described above with respect to FIGS. 1C, 7, 8 and 9. Micrographs of these filaments are shown in FIG. 17, where the lighter toned material is PC and the darker toned material is ABS.

To evaluate the mechanical performance of parts printed using the various filament designs, single edge notched beam (SENB) specimens were fabricated according to ASTM E1820. This test method subjects beams of material to bending loads that drive a crack through the material via fracture. The test method provides protocols for converting the measured specimen geometry, crosshead load, crosshead displacement, and crack propagation histories into values of fracture toughness, or $J_{1c}$, with units of J/m². Materials with low $J_{1c}$ values are less tough, and more likely to behave in a brittle manner, while materials with high $J_{1c}$ values are more tough, and more likely to behave in a ductile manner. The shape of the load-displacement curve, and the visible appearance of a rough crack face with local whitening due to plastic deformation and crazing, can be used to determine whether a particular sample is failing in a brittle or ductile manner.

In prior publications, it has been shown that this SENB test method can be used to evaluate the fracture toughness of the interlaminar interfaces in FFF parts. To create SENB specimens for the present comparison, the eight dual-material filaments produced via thermal drawing were used to print SENB test specimens using a Lulzbot Taz6 printer (Loveland, CO) with a layer height of 0.22 mm, a bed temperature of 110° C., and a print head temperature of 280° C. The specimens were printed in an orientation that forces fracture to occur preferentially between print layers. SENB specimens were 100 mm long×10 mm wide×20 mm high, and loaded in 3-point bending with a span between lower load points of 80 mm.

For comparison, three additional sample types were created using standard FFF filaments: PC-10 and ABS-M30 FDM filaments from Stratasys Inc., and "PC-ABS" FDM filament from Stratasys. This PC-ABS filament is a blend of PC and ABS, produced by co-compounding the two polymers followed by extrusion. In PC-ABS, the two materials are mixed at a fine scale, with characteristic domain sizes of 1 μm or less in a random, non-structured arrangement. SENB test specimens for these three materials were fabricated using a Lulzbot Taz6 printer (Loveland, CO) with a layer height of 0.22 mm, a bed temperature of 110° C., and a print head temperature of 240° C., 290° C., or 280° C. for Stratasys ABS, PC, and PC-ABS materials.

Some test specimens were printed and then fracture tested without additional processing prior to fracture testing. Other test samples were printed, then annealed in an oven at 135° C. for 168 h, and then subject to fracture testing. All annealed SENB samples were annealed in a metal mold. The mold is necessary for the ABS samples in order to hold shape during annealing. The other samples likely could have been annealed while freestanding, but were annealed in a mold to maintain consistent annealing conditions for comparison purposes.

FIG. 22 summarizes the relevant geometric characteristics of the filaments used to produce these test specimens.

FIG. 23 compares the fracture toughness behavior of as-printed specimens, without annealing. All samples exhibit fracture toughness values less than 1000 J/m² and, with the exception of one of the X8 samples, all tests exhibit brittle fracture behavior.

FIG. 24 compares the fracture toughness behavior of printed specimens that were subsequently annealed. The ABS specimen sees a dramatic increase in fracture toughness after annealing, to a value approaching 7000 J/m². The ABS annealing data demonstrates that annealing a polymer above its $T_g$ can result in significant increases in interlaminar strength. However, this part would undergo extreme creep and thermal distortion if annealed outside of a mold, therefore annealing of freestanding ABS parts above $T_g$ is not practical. The standard PC and PC-ABS filaments undergo a slight increase in fracture toughness, but failures are still brittle. It is not surprising that little improvement for PC specimens is observed, because the annealing temperature is below the $T_g$ of PC. The poor toughness of the annealed PC-ABS specimen indicates that the fine scale and random structure of the PC and ABS in this filament does not allow the ABS to flow, wet, and heal an interlaminar interface.

Figure 18:
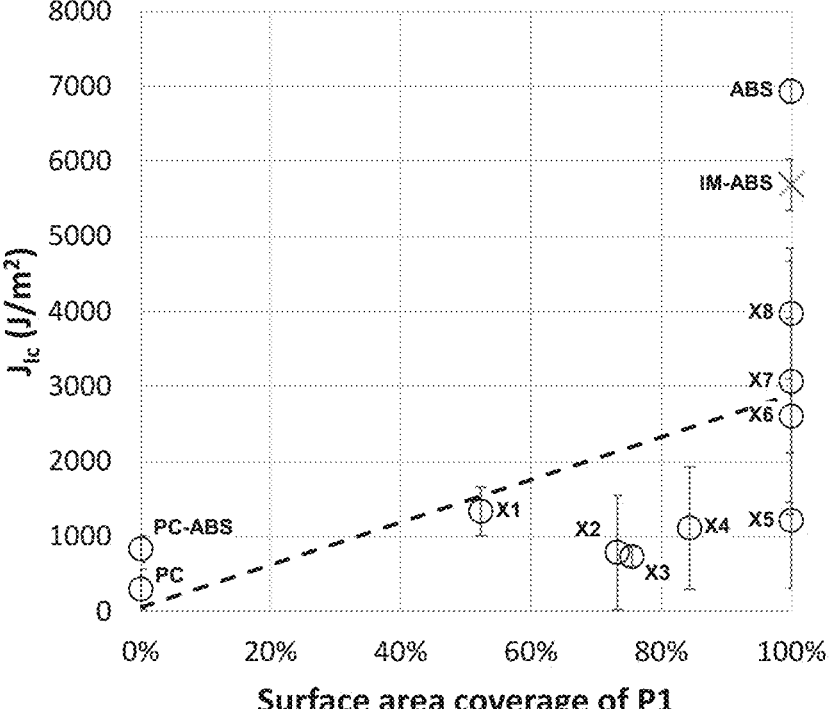
FIGS. 18, 19 and 20 show fracture toughness data for test coupons that were printed using conventional ABS, PC, and PC-ABS filaments, and filaments X1-X8. These test coupons were annealed after printing, and prior to fracture toughness testing. Also shown in the figures is reference data for injection molded ABS. Each figure plots fracture toughness values as a function of a geometric parameter associated with the preform and filament design.
Figure 19:
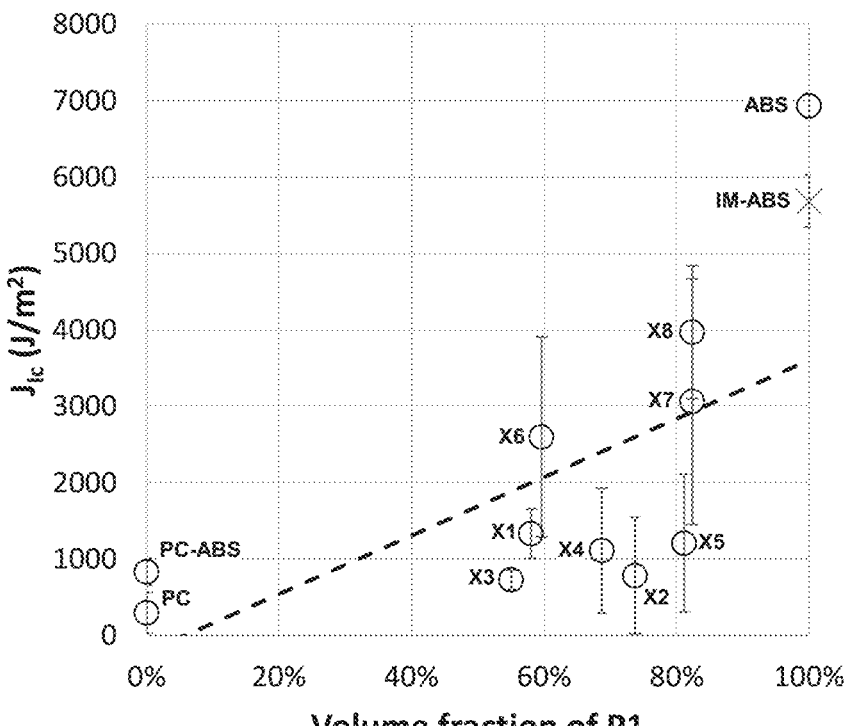
Figure 20:
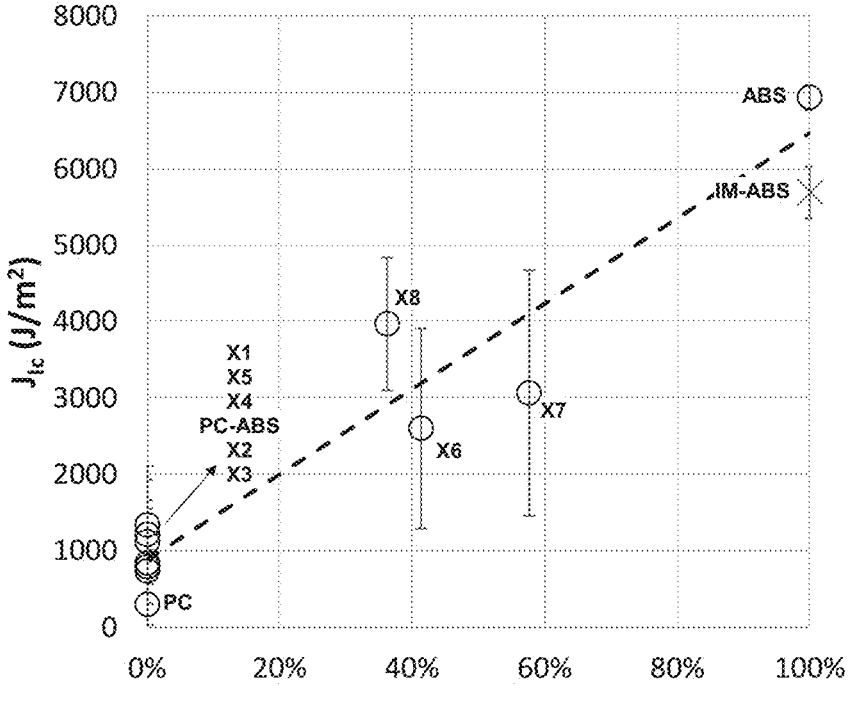

FIG. 24 also compares the fracture toughness of annealed specimens printed from dual material filaments X1-X8 (FIGS. 15A, 15B, 15C, 15D, 15E, 15F, 15G and 15H). A wide range in fracture toughness values is evident, supporting the claim that the details of the geometric arrangement of phases P1 and P2 in a filament are critical for achieving high interlaminar strength. To better understand these trends, FIGS. 18, 19 and 20 plot fracture toughness as a function of the geometric parameters listed in FIG. 22. It is evident that increasing surface coverage of P1 (in this case, ABS), increasing volume fraction of P1, and increasing outer band thickness of P1 all trend positively toward creating a high toughness material. If we consider cases X6-X8 in particular, these three designs all have 100% surface coverage of P1, but X8 has superior toughness. Cases X7 and X8 have identical volume fraction of P1, but X8 has superior toughness. And cases X6 and X7 have a larger band thickness than design X8, but X8 has superior toughness. Therefore, while the trends of increasing surface coverage, volume fraction, and band thickness of P1 generally lead to improved toughness, further geometric details are also critical. The star-shaped theme as exemplified by X8 is superior to simple concentric designs as in cases X6 and X7. The superior annealing behavior of X8 is likely due to the sparseness of its P2 (PC) core relative to a simple concentric design, allowing for easier extrusion and compaction during deposition, and less impediment to wetting and healing for the P1 phase during annealing.

Furthermore, filament X6 was challenging to print due to uneven extrusion and clogging of the print head. It is likely that these effects are due to the recirculation issues as described with respect to FIG. 12. In contrast, design X8 printed with high quality and without clogging or uneven flow.

Also included in FIGS. 23 and 24 and FIGS. 18, 19 and 20 is data for injection molded ABS (IM-ABS). An injection molded sample should not have any weak interlaminar planes, because the part is consolidated under very high pressure and at a temperature well above $T_g$. The data shows that the printed and annealed ABS specimen provides a fracture toughness higher than the reference IM-ABS value. This difference can be due to a number of factors, including grade of ABS used and details of precrack geometry for the SENB specimens. However, the results show that thermal annealing without high pressure can lead to toughness values comparable to IM-ABS values, and that the X8 dual material filament is producing toughness values that are only 30% below reference injection molded ABS data. Furthermore, failure of annealed X8 specimens are consistently ductile, like injection molded parts, and in stark contrast with as-printed ABS, PC, and PC-ABS parts which exhibit brittle failure. The ability of the X8 parts to undergo graceful, ductile failure makes them much better suited to replace injection molded parts over a wide range of applications.

To demonstrate thermal stability during annealing, bars of material were printed with dimensions of 10 mm wide×6 mm high×60 mm long, with their long direction oriented horizontally on the print bed. These samples were then clamped at both ends (double cantilever) in a dynamic mechanical analyzer, rapidly heated to 135° C., and then held at 135° C. for up to 1 h. The downward displacement of the midspan of each specimen was recorded as a function of time, with this downward creep due to the weight of the specimen only, as no additional external force was applied. FIG. 25 summarizes the average rate of creep for the specimens tested. The ABS sample undergoes the most dramatic creep, due to the material being above its $T_g$. In contrast, the other materials all contain PC, and therefore are able to resist this thermal creep action, exhibiting approximately 10× slower creep during the course of the experiment.

Figures 21A, 21B, 21C, 21D, 21E:
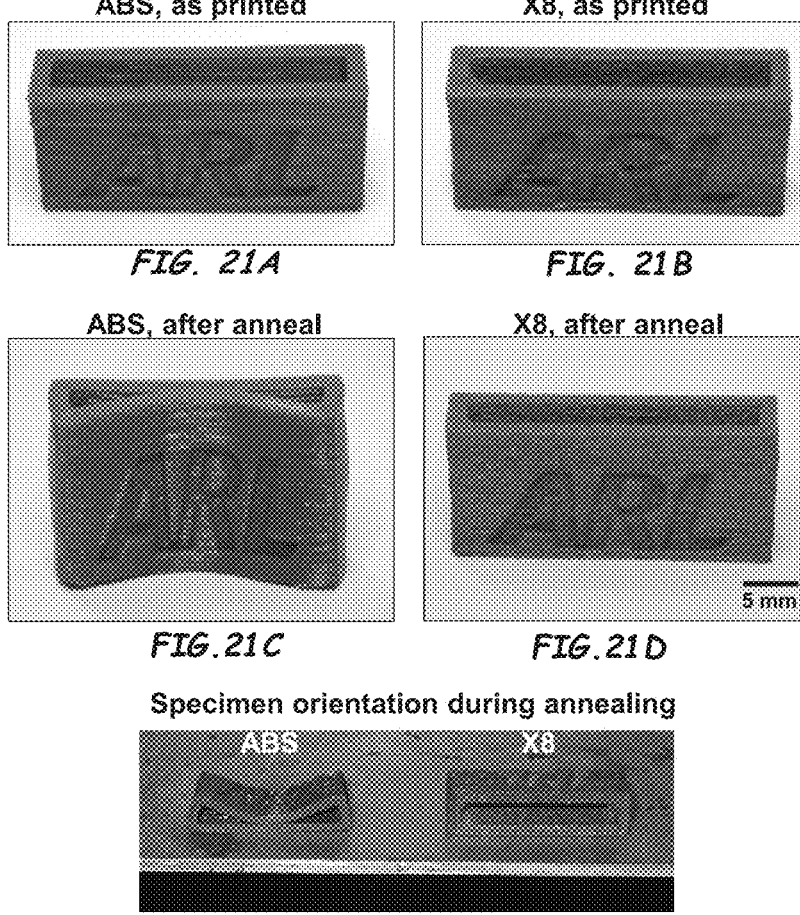
FIGS. 21A, 21B, 21C, 21D and 21E depict a printed structure using ABS as compared to the same structure printed using an X8 filament.

To further demonstrate thermal stability, hollow prismatic bars 7 mm wide×30 mm long×13 mm tall, with an embossed surface logo, were printed using ABS and X8 filament, as shown in FIGS. 21A and B. These specimens both printed with comparable visual quality and dimensional accuracy, demonstrating the printability of the X8 filament. The two specimens were then placed in an oven as shown in FIG. 21E, and annealed at 135° C. for 1 h. As shown in FIGS.

21C, 21D, and 21E, the ABS sample underwent significant creep and thermal relaxation, while the X8 sample underwent no apparent change in geometry. This example further clarifies that the X8 filament can be used to print high quality parts that maintain geometry during the annealing process.

In summary, a method is demonstrated for producing dual material filament as exemplified by geometry X8 ("asterisk"); this filament prints in an expedient manner in a conventional printer, producing parts of high visual quality and geometric accuracy; and these parts can be subsequently annealed to achieve high interlaminar toughness and consistent ductile failure, without measurable change in part geometry. A wide range of multi-material filaments can be envisioned based on the designs presented herein, included many geometries similar to X8 that include an outer band of P1, and a star-shaped core of P2 with a central node and multiple extending arms. Although all of these designs have not yet been tested over the vast number of possible P1 and P2 material pairings, it is possible that some of the designs described herein will allow for the production of FFF parts that meet or exceed the toughness of injection molded polymer parts.

Although the specific example data set provides values of fracture toughness, it is expected that tensile strength values in the z-direction for parts printed using the presently disclosed filament approach will greatly exceed the z-direction strength values of as-printed materials in a manner consistent with the observed increases in fracture toughness. Z-direction strength values as reported in published literature for as-printed FFF parts exhibit a wide range in values, in part because the materials fail in a brittle manner and therefore are very sensitive to inclusions, flaws, and loading conditions. Because the high toughness FFF parts disclosed herein fail in a ductile manner with high energy to failure, they will be less sensitive to flaws and loading details, and will exhibit higher tensile strength. Therefore, the examples provided herein also implicitly provide evidence of high z-direction strength.

Various modifications of the present invention, in addition to those shown and described herein, will be apparent to those skilled in the art of the above description. Such modifications are also intended to fall within the scope of the appended claims.

Patents, publications, and applications mentioned in the specification are incorporated herein by reference to the same extent as if each individual patent, publication, or application was specifically and individually incorporated herein by reference.

The foregoing description is illustrative of particular aspects of the invention, but is not meant to be a limitation upon the practice thereof. The following claims, including all equivalents thereof, are intended to define the scope of the invention.

The invention claimed is:

1. A filament or preform for use in 3D printing, the filament or preform comprising a first thermoplastic polymer and a second thermoplastic polymer, the filament or preform having an outer surface;

wherein the first thermoplastic polymer and the second thermoplastic polymer are physically associated in a geometric arrangement, in which a flow temperature of said first thermoplastic polymer is greater than 10 degrees Celsius higher than a flow temperature of said second thermoplastic polymer, wherein the cross-sectional geometry of the first thermoplastic polymer comprises a central node with extending arms substantially surrounded by the second thermoplastic polymer in the geometric arrangement, wherein at least 90% of the outer surface is comprised of the second thermoplastic polymer, wherein the filament or preform has a diameter of at least 1 millimeter, wherein the cross-sectional geometry of the second thermoplastic polymer consists of a second contiguous shape and the cross-sectional geometry of the first thermoplastic polymer consists of a first contiguous shape and considering an area defined by a circumscribed circle around the first contiguous shape, the area fraction of the first thermoplastic polymer within the circumscribed circle is less than 75%, wherein the filament or preform is configured to be 3D printed as multiple layers of extrudate through a nozzle using a 3D printer which accepts continuous filaments with a diameter of at least 1 mm, and further wherein the first and second thermoplastic polymers are selected so that the interlaminar strength between the multiple layers of extrudate, after annealing at a temperature above the flow temperature of the second thermoplastic polymer and below the flow temperature of the first thermoplastic polymer, is at least 10% of the molded strength of the second thermoplastic polymer.

2. The filament or preform of claim 1, where the second thermoplastic polymer comprises a volume of material that forms an outer band of the filament or preform, and where the band thickness is at least 10% of the diameter of the filament or preform.

3. The filament or preform of claim 1, wherein said regular geometric arrangement is an interlocking geometric arrangement.

4. The filament or preform of claim 1, wherein at least 95 percent of the outer surface by area is comprised of the second thermoplastic polymer.

5. The filament or preform of claim 1, where there are at least 3 extending arms.

6. The filament or preform of claim 1, where each arm is either a rectangle, triangle, ellipse, or trapezoid.

7. The filament or preform of claim 1, where the first thermoplastic polymer or the second thermoplastic polymer are amorphous polymers.

8. The filament or preform of claim 1, where the first thermoplastic polymer or the second thermoplastic polymer are semi-crystalline polymers.

9. The filament or preform of claim 1, where said first thermoplastic polymer, said second thermoplastic polymer, or both comprise one or more of a thermoplastic material selected from the group consisting of: acrylonitrilebutadienestyrene (ABS); high density polyethylene (HDPE); low density polyethylene (LDPE); polyamide (PA); polyamide imide (PAI); polyarylate (PAR); polyaryletherketone (PAEK); polybutylene terephthalate (PBT); polycarbonate (PC); polyester; polyether sulfone (PES); polyetherketoneketone (PEKK); polyetheretherketone (PEEK); polyetherimide (PEI); polyetherketone (PEK); polyetherketonetherketoneketone (PEKEKK); polyethlyene (PE); polyethylene terephthalate (PET); polyimide (PI); polylactic acid (PLA); polymethyl methacrylate (PMMA); polyoxymethylene (POM); polyphenylene oxide (PPO); polyphenylene sulfide (PPS); polyphenylsulfone (PPSU); polyphthalamide (PPA); polyphthalate carbonate (PPC); polyproplyene (PP); polystyrene (PS); polysulfone (PSF); polyurethane (PU); polyvinyl chloride (PVC); polyvinylidene fluoride (PVDF); styrene acrylonitrile (SAN); styrene maleic anhydride (SMA); ultrahigh molecular weight polyethylene (UHMWPE); high impact polystyrene (HIPS); polyvinyl alcohol (PVA); glycol-modified polyethylene terephthalate (PETG); polytetrafluoroethylene (PTFE); polyhydroxyalkanoate, polybutylene succinate (PBS), polycaprolactone (PCL), polyanhydride and thermotropic liquid crystalline polymers.

10. The filament or preform of claim 1 further comprising at least one additional thermoplastic polymer, physically associated in a regular geometric arrangement, in which a flow temperature of one of the thermoplastic polymers is greater than 10 degrees Celsius higher than a flow temperature of at least one of the other thermoplastic polymers, and wherein at least 90% of the outer surface is comprised of one of the thermoplastic polymers that does not have the highest flow temperature.

11. The filament or preform of claim 1, wherein the filament or preform has a diameter of 1-3 millimeters.

12. The filament or preform of claim 1, wherein the flow temperature of said first thermoplastic polymer is greater than 20 degrees Celsius higher than a flow temperature of said second thermoplastic polymer.

13. The filament or preform of claim 1, where the second thermoplastic polymer comprises a volume of material that forms an outer band of the filament or preform, and where the band thickness is at least 15% of the diameter of the filament or preform.

14. The filament or preform of claim 1, where said first thermoplastic polymer, said second thermoplastic polymer, or both comprise one or more thermotropic liquid crystalline polymers.

15. The filament or preform of claim 14, wherein the one or more thermotropic liquid crystalline polymers comprise copolymers of 4-hydroxybenzoic acid (HBA) and 6-hydroxy-2-naphthoic acid (HNA).

16. The filament or preform of claim 1, wherein the geometric arrangement is selected from the group consisting of: (i) a cross-sectional geometry of the first thermoplastic polymer comprising a central node with three extending arms with triangularly-shaped end points surrounded by the second thermoplastic, and (ii) a cross-sectional geometry of the first thermoplastic polymer comprising a central node with five extending arms surrounded by the second thermoplastic and the arms do not extend to the edge of the filament or preform.

17. The filament or preform of claim 1, wherein the first and second thermoplastic polymers are selected so that multiple layers of extrudate, after annealing at a temperature above the flow temperature of the second thermoplastic polymer and below the flow temperature of the first thermoplastic polymer, exhibit ductile failure.

18. The filament or preform of claim 1, wherein the first and second thermoplastic polymers are selected so that the interlaminar strength between the multiple layers of extrudate, after annealing at a temperature above the flow temperature of the second thermoplastic polymer and below the flow temperature of the first thermoplastic polymer, is at least 25% of the molded strength of the second thermoplastic polymer.

19. The filament or preform of claim 1, wherein the first thermoplastic polymer is selected based on its suitability for resisting thermal deflection during annealing.

20. A three dimensional object resulting from the deposition of multiple layers of extrudate through a nozzle using a 3D printer which accepts a heated filament or preform of claim 1, and optionally annealed at a temperature above the flow temperature of the second thermoplastic polymer and below the flow temperature of the first thermoplastic polymer.

21. The three dimensional object of claim 20, wherein said first thermoplastic polymer, said second thermoplastic polymer, or both comprise one or more thermotropic liquid crystalline polymers.

22. The three dimensional object of claim 20, wherein the cross-sectional geometry of the extrudate of the filament or preform is preserved in the object after 3D printing and/or the optional annealing.

23. The three dimensional object of claim 20, wherein having been 3D printed into an object, that the multiple layers of extrudate have an interlaminar fracture toughness greater of at least 500 J/m².

24. The three dimensional object of claim 23, wherein, if subsequently annealed, the multiple layers of annealed extrudate have an interlaminar fracture toughness of at least 3000 J/m².

25. The three dimensional object of claim 20, wherein the layers of extrudate when 3D printed have a diameter less than 1 mm.

26. A filament or preform for use in 3D printing, the filament or preform comprising a first thermoplastic polymer and a second thermoplastic polymer, the filament or preform having an outer surface;
  wherein the first thermoplastic polymer and the second thermoplastic polymer are physically associated in a geometric arrangement, in which a flow temperature of said first thermoplastic polymer is greater than 10 degrees Celsius higher than a flow temperature of said second thermoplastic polymer,
  wherein the filament or preform has a diameter of at least 1 millimeter,
  wherein the first thermoplastic polymer comprises a central node with extending arms substantially surrounded by the second thermoplastic,
  wherein said regular arrangement is an interlocking arrangement of the first and second thermoplastic polymers,
  wherein the filament or preform is configured to be 3D printed as multiple layers of extrudate through a nozzle using a 3D printer which accepts continuous filaments with a diameter of at least 1 mm, and
  further wherein the first and second thermoplastic polymers are selected so that the change in overall dimensions of the multiple layers of extrudate, after printing and subsequent annealing at a temperature above the flow temperature of the second thermoplastic polymer and below the flow temperature of the first thermoplastic polymer, is less than 10%.

27. The filament or preform of claim 26, wherein the extending arms do not reach the outer surface.

28. The filament or preform of claim 26, wherein the filament or preform has a diameter of 1-3 millimeters.

29. The filament or preform of claim 26, wherein the flow temperature of said first thermoplastic polymer is greater than 20 degrees Celsius higher than a flow temperature of said second thermoplastic polymer.

30. The filament or preform of claim 26, wherein the interlocking geometric arrangement is selected from the group consisting of: (i) a cross-sectional geometry of the first thermoplastic polymer comprising a central node and five spokes extending to the edge of the filament or preform having a flange at their ends surrounded by the second thermoplastic, (ii) a cross-sectional geometry of the first thermoplastic polymer comprising a central node and three spokes extending to the edge of the filament or preform having a flange at their ends surrounded by the second thermoplastic, (iii) a cross-sectional geometry of the first thermoplastic polymer comprising a central node with three extending arms with triangularly-shaped end points surrounded by the second thermoplastic, and (iv) a cross-sectional geometry of the first thermoplastic polymer comprising a central node with five extending arms surrounded by the second thermoplastic and the arms do not extend to the edge of the filament or preform.

31. A three dimensional object formed of multiple layers of extrudate of the filament or preform of claim 26 passed through a nozzle using a 3D printer, and optionally annealed at a temperature above the flow temperature of the second thermoplastic polymer and below the flow temperature of the first thermoplastic polymer.

32. The three dimensional object of claim 31, wherein the cross-sectional geometry of the extrudate of the filament or preform is preserved in the object after 3D printing and/or the optional annealing.

33. A filament or preform for use in 3D printing, the filament or preform comprising a first thermoplastic polymer and a second thermoplastic polymer, the filament or preform having an outer surface;
  wherein the first thermoplastic polymer and the second thermoplastic polymer are physically associated in a geometric arrangement, in which a flow temperature of said first thermoplastic polymer is greater than 10 degrees Celsius higher than a flow temperature of said second thermoplastic polymer,
  wherein the cross-sectional geometry of the first thermoplastic polymer comprises a central node with at least three extending arms, where each arm has the same length and uniform thickness along its length, surrounded by the second thermoplastic polymer,
  wherein at least 50% of the outer surface is comprised of the second thermoplastic polymer,
  wherein the filament or preform has a diameter of at least 1 millimeter, and
  further wherein the filament or preform is configured to be 3D printed as multiple layers of extrudate through a nozzle using a 3D printer which accepts continuous filaments with a diameter of at least 1 mm, and the multiple layers of extrudate can be subsequently annealed above the flow temperature of the second polymer and below the flow temperature of the first thermoplastic polymer to provide an increase in the interlaminar strength between the printed multiple layers of extrudate of at least 100% after annealing.

34. The filament or preform of claim 33, wherein one of the polymers is a propellant or explosive.

35. The filament or preform of claim 33, wherein the geometric arrangement is a cross-sectional geometry of the first thermoplastic polymer comprising a central node with five extending arms surrounded by the second thermoplastic and the arms do not extend to the edge of the filament or preform.

36. The filament or preform of claim 33, wherein the first polymer comprises polycarbonate (PC) and the second polymer comprises acrylonitrile butadienestyrene (ABS).

37. A three dimensional object formed of multiple layers of extrudate of the filament or preform of claim 33 passed through a nozzle using a 3D printer, and optionally annealed at a temperature above the flow temperature of the second thermoplastic polymer and below the flow temperature of the first thermoplastic polymer.

38. The three dimensional object of claim 37, wherein the cross-sectional geometry of the extrudate of the filament or preform is preserved in the object after 3D printing and/or the optional annealing.

39. The filament or preform of claim 37, wherein having been 3D printed into an object, the multiple layers of extrudate have an interlaminar fracture toughness of 282-566 J/m$^2$, and if subsequently annealed, the multiple layers of annealed extrudate have an interlaminar fracture toughness of 730-3970 J/m$^2$.

40. A filament or preform, the filament or preform comprising a first thermoplastic polymer and a second thermoplastic polymer, the filament or preform having an outer surface;

wherein the first thermoplastic polymer and the second thermoplastic polymer are physically associated in a geometric arrangement, in which a flow temperature of said first thermoplastic polymer is greater than 10 degrees Celsius higher than a flow temperature of said second thermoplastic polymer, wherein the filament or preform has a diameter of at least 1 millimeter, wherein the cross-sectional geometry of the first thermoplastic polymer comprises a central node with three to six extending arms, where each arm has the same length and uniform thickness along its length, surrounded by the second thermoplastic polymer in the geometric arrangement, wherein at least 90% of the outer surface is comprised of the second thermoplastic polymer, and further wherein the filament or preform is configured to be 3D printed as multiple layers of extrudate through a nozzle using a 3D printer which accepts continuous filaments with a diameter of at least 1 mm, and the multiple layers of extrudate can be subsequently annealed above the flow temperature of the second polymer and below the flow temperature of the first thermoplastic polymer to provide an increase in the interlaminar strength between the printed multiple layers of extrudate of at least 100% after annealing.

41. The filament or preform of claim 40, wherein the first polymer is a propellant or explosive.

42. A filament or preform for use in 3D printing, the filament or preform comprising a first thermoplastic polymer and a second thermoplastic polymer, the filament or preform having an outer surface;

wherein the first thermoplastic polymer and the second thermoplastic polymer are physically associated in a geometric arrangement, in which a flow temperature of said first thermoplastic polymer is greater than 10 degrees Celsius higher than a flow temperature of said second thermoplastic polymer, wherein the cross-sectional geometry of the first thermoplastic polymer comprises a central node with five extending, where each arm has the same length and uniform thickness along its length, surrounded by the second thermoplastic polymer, wherein at least 90% of the outer surface is comprised of the second thermoplastic polymer, wherein the filament or preform has a diameter of at least 1 millimeter, and further wherein the filament or preform is configured to be 3D printed as multiple layers of extrudate through a nozzle using a 3D printer which accepts continuous filaments with a diameter of at least 1 mm, and the multiple layers of extrudate can be subsequently annealed above the flow temperature of the second polymer and below the flow temperature of the first thermoplastic polymer to provide an increase in the interlaminar strength between the printed multiple layers of extrudate of at least 100% after annealing.

43. The filament or preform of claim 42, wherein the first polymer comprises polycarbonate (PC) and the second polymer comprises acrylonitrile butadienestyrene (ABS).

44. The filament or preform of claim 42, wherein the geometric arrangement is selected from the group consisting of: (i) a cross-sectional geometry of the first thermoplastic polymer comprises a central node with five trapezoidal-shaped extending arms which increase in thickness as they extend from the center of the filament or preform surrounded by the second thermoplastic polymer, (ii) a cross-sectional geometry of the first thermoplastic polymer comprises a central node with five arrow-shaped extending arms pointing outwardly surrounded by the second thermoplastic polymer, (iii) a cross-sectional geometry of the first thermoplastic polymer comprises a central node with five offset rectangular-shaped extending arms surrounded by the second thermoplastic polymer, and (iv) a cross-sectional geometry of the first thermoplastic polymer comprises a central node with five extending arms having circumferentially extending tabs at their endpoints surrounded by the second thermoplastic polymer.

45. A three dimensional object formed of multiple layers of extrudate of the filament or preform of claim 42 passed through a nozzle using a 3D printer, and optionally annealed at a temperature above the flow temperature of the second thermoplastic polymer and below the flow temperature of the first thermoplastic polymer.

46. The three dimensional object of claim 45, wherein the cross-sectional geometry of the extrudates of the filament or preform is substantially preserved in the object after printing and/or the optional annealing.

47. The three dimensional object of claim 45, wherein the object after 3D printing is subsequently annealed at a temperature above the flow temperature of the second polymer and below the flow temperature of the first thermoplastic polymer there is no apparent change in geometry of the extrudate.

48. The three dimensional object of claim 45, wherein having been 3D printed into an object, the multiple layers of extrudate in the have an interlaminar fracture toughness of at least 566 J/m$^2$, and if subsequently annealed, the multiple layers of extrudate in the 3D printed annealed object have an interlaminar fracture toughness of at least 3970 J/m$^2$.

49. The three dimensional object of claim 45, wherein having been 3D printed into an object and subsequently annealed, the multiple layers of extrudate of the 3D printed annealed object, exhibit an improvement in strength of at least 600% compared to the multiple layers of extrudate in the 3D printed object in an un-annealed state.

50. The three dimensional object of claim 45, wherein having been 3D printed into an object and subsequently annealed, the creep rate for the multiple layers of annealed extrudate at 135° C. is 1.50-2.15 μm/min.

* * * * *